(12) United States Patent
Matsui et al.

(10) Patent No.: US 7,269,741 B2
(45) Date of Patent: Sep. 11, 2007

(54) RECORDING APPARATUS, MEDIUM, METHOD, AND RELATED COMPUTER PROGRAM

(75) Inventors: Shinichi Matsui, Kobe (JP); Naohiko Noguchi, Yokohama (JP); Mitsuhiro Sato, Atsugi (JP); Takashi Shimojima, Tokyo (JP); Kiichi Hasegawa, Yokohama (JP); Norio Nakamura, Nara (JP); Kazuya Fujimura, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 688 days.

(21) Appl. No.: 10/187,896

(22) Filed: Jul. 3, 2002

(65) Prior Publication Data

US 2003/0041253 A1    Feb. 27, 2003

(30) Foreign Application Priority Data

Jul. 5, 2001    (JP) ............................. 2001-204322

(51) Int. Cl.
*G06F 12/14*    (2006.01)
*G06F 17/30*    (2006.01)

(52) U.S. Cl. ........................................ 713/189; 726/26
(58) Field of Classification Search ................ 726/27; 380/286

See application file for complete search history.

(56) References Cited

U.S. PATENT DOCUMENTS

| | | | | |
|---|---|---|---|---|
| 4,961,134 A | * | 10/1990 | Crus et al. ..................... 707/8 |
| 5,408,082 A | * | 4/1995 | Takagi et al. ............... 235/492 |
| 5,623,637 A | * | 4/1997 | Jones et al. .................. 711/164 |
| 5,835,935 A | * | 11/1998 | Estakhri et al. ............. 711/103 |
| 7,089,271 B1 | * | 8/2006 | Kihara et al. ............... 707/205 |

FOREIGN PATENT DOCUMENTS

| | | |
|---|---|---|
| EP | 0 351 387 | 1/1990 |
| JP | 02-252035 | 10/1990 |
| JP | 6-250798 | 9/1994 |
| JP | 2000-163882 | 6/2000 |

OTHER PUBLICATIONS

Copending U.S. Appl. No. 09/557,872, filed Apr. 24, 2000, entitled "Semiconductor Memory Card and Data Reading Apparatus".

* cited by examiner

*Primary Examiner*—Emmanuel L. Moise
*Assistant Examiner*—David J. Pearson
(74) *Attorney, Agent, or Firm*—Wenderoth, Lind & Ponack, L.L.P.

(57) ABSTRACT

A recording apparatus is provided for an SD memory card that has a plurality of EPUBxxx.KEY files recorded thereon, each file having a plurality of Key&Rule Entry areas, and an SD_EPUB.MMG file being read from the recording medium prior to the writing of data. A bitmap in SD_EPUB.MMG shows for each EPUBxxx.KEY file whether the EPUBxxx.KEY file has at least one Key&Rule Entry area not in use, or whether all the Key&Rule Entry areas are in use. Based on the bitmap in the read SD_EPUB.MMG file, the recording apparatus opens EPUB#u.KEY having an unused Key&Rule Entry area and writes data into the unused Key&Rule Entry area in the file. If all the Key&Rule Entry areas in EPUB#u.KEY become in use as a result of the writing of the data, the recording apparatus updates the bitmap in SD_EPUB.MMG.

21 Claims, 18 Drawing Sheets

FIG.3

EPUBxxx. Key

| n-bit bitmap |
|---|
| Key&Rule Entry#1 |
| Key&Rule Entry#2 |
| Key&Rule Entry#3 |
| Key&Rule Entry#4 |
| Key&Rule Entry#5 |
| Key&Rule Entry#6 |
| Key&Rule Entry#7 |
| ⋮ |
| Key&Rule Entry#n | x=1 x=16

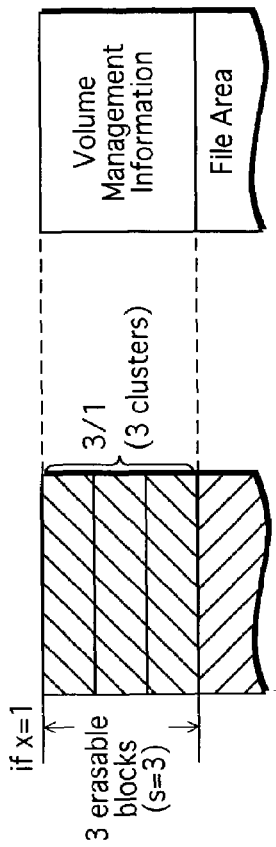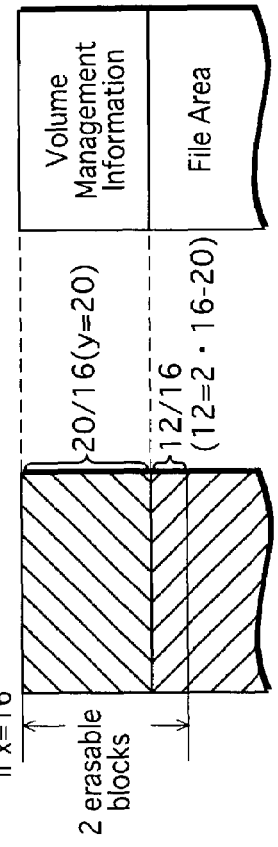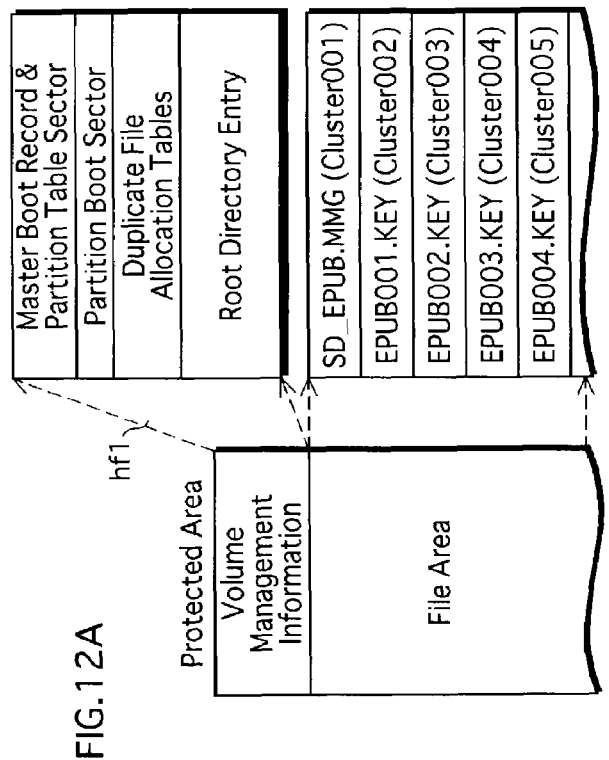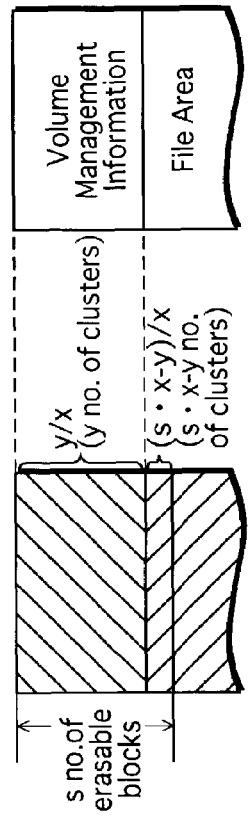

RECORDING APPARATUS, MEDIUM, METHOD, AND RELATED COMPUTER PROGRAM

BACKGROUND OF THE INVENTION

1. Field of the Invention

The present invention relates to a recording apparatus, a recording medium, a recording method, and a related computer program, the recording apparatus writing secure data such as encryption keys, rights management information, and billing information into an SD memory card or similar recording medium.

2. Related Art

A secure digital (SD) memory card is a recording medium used to record contents, secure data, and the like distributed by a contents distribution service. Not only that, but the SD memory card can store distributed secure data with a high level of confidentiality, and for this reason SD memory cards are quickly gaining the confidence of contents distribution service providers. The structure of the SD memory card capable of providing this high level of confidentiality is described as follows. An SD memory card includes (i) a user data area in which content is recorded in encrypted form, and (ii) a protected area in which secure data corresponding to the content is recorded. The user data area can be freely accessed by an apparatus to which the SD memory card is connected. In contrast, the protected area can only be accessed if there is mutual authentication between the SD memory card and the apparatus. Thus, an apparatus provided with a license by the contents distribution service provider to manage the distributed contents will be able to clear the mutual authentication process, while access by an unauthorized apparatus will be denied at the mutual authentication stage. In this way the confidentiality of secure data is maintained.

While mutual authentication is required to access the protected area, the protected area is managed using a file system, like any of the other areas on a semiconductor memory card. According to a conventional file allocation table (FAT) file system, a single file is managed in a unit known as a "cluster". Secure data, although highly confidential, tends to be of small 16-byte or 64-byte size, which is less than one-hundredth the size of a single cluster. Because of this large difference in size, storage space is very inefficiently used when one piece of secure data is stored in a single file.

This problem can be overcome by storing plural pieces of secure data together in a single file. However, the storage of plural pieces of secure data in single file eventually results in the problem of "fragmentation" (i.e. unused areas lying scattered between used areas).

When an SD memory card is used over a long period of time to record distributed contents, a large amount of secure data accumulates on the SD memory card. The number of files on the SD memory card can be increased to meet storage needs. On the other hand, secure data is deleted when corresponding content becomes obsolete. Since the storage space of an SD memory card is often limited, secure data corresponding to new content should preferably be recorded in an unused area arising from a deletion. However, because unused areas become scattered throughout a plurality of files when plural pieces of secure data are stored in a single file, a search is required to determine which files have unused areas available to write secure data. In addition, mutual authentication is required between the SD memory card and the apparatus in order to access a file in the protected area, and this mutual authentication process becomes an overhead that extends the time required to complete a file access. Since this overhead is incurred in opening each file, much time is wasted searching for a file having an unused area, and as a result a long period of time is required to complete the writing of data.

SUMMARY OF THE INVENTION

The scattering of unused areas throughout a plurality of files can be avoided by performing "garbage collection" processing in order to collect the unused areas together. However, garbage collection requires much reading and writing of files. A semiconductor memory card such as an SD memory card includes a flash memory, and the number of times that the flash memory can be rewritten is limited to several hundreds of thousands of times. Thus, performing garbage collection because of one or two unused areas shortens the lifespan of the SD memory card. If garbage collection is not performed, then unused areas scattered throughout the plurality of files must be selected for writing.

An object of the present invention is to provide a recording apparatus capable of writing secure data at a high-speed into unused areas scattered throughout a plurality of files.

The above objective is achieved by a recording apparatus for a recording medium that has a plurality of files recorded thereon, each file having a plurality of entry areas. The recording apparatus includes a reading unit operable to read condition information from the recording medium, the condition information showing for each file whether the file is in a first condition in which one or more entry areas are not in use, or in a second condition in which all the entry areas are in use; a writing unit operable to specify a file in a first condition by referring to the read condition information, and to write data into an unused entry area of the specified file; and an updating unit operable to update the condition information so as to show the specified file as being in the second condition if all the entry areas in the specified file become in use as a result of the writing of the data by the writing unit.

According to this structure, condition information is provided that shows which of a plurality of files contain unused entry areas. Thus, even when the unused areas are scattered throughout the plurality of files, a file having an unused area can be quickly determined by referring to the condition information. Since a total of two file access operations are required (i.e. once to open the condition information, and once again to open the file having an unused area), the recording apparatus does not have to search through and open a plurality files to find a file having an unused area, and as a result the time required to write new content can be shortened.

Here, the recording apparatus may further include a creating unit operable to create a file that is in the first condition if all of the files on the recording medium are shown to be in the second condition when the read condition information is referred to by the writing unit.

According to this structure, a new file is created by the recording apparatus after all the unused entry areas in existing files have been written, and thus new files are not created unnecessarily. Because the number of files is minimized, data recorded on the recording medium can be efficiently organized over the long term. If the recording medium is an SD memory card, the protected area is often a comparatively small area of the total area of the SD memory card. To be specific, 1% of the total area of the SD memory card is allocated to the protected area. As such, the number of files in the protected area is restricted. However, because the recording apparatus described above minimizes the number of files, the protected area can be used very effectively.

BRIEF DESCRIPTION OF THE DRAWINGS

These and other objects, advantages and features of the invention will become apparent from the following description thereof taken in conjunction with the accompanying drawings that illustrate specific embodiments of the present invention.

In the drawings:

FIG. 3 shows an internal structure of an EPUBxxx.KEY file;

FIG. 12A shows a detailed structure of the protected area according to an embodiment 3 of the present invention;

FIG. 12B shows an example of y number of clusters allocated to store volume management information, the y number of clusters being part of a total of s number of clusters included in s number of erasable blocks;

FIG. 12C shows an allocation of clusters to store volume management information when x=1;

FIG. 12D shows an allocation of clusters to store volume management information when x=16;

DETAILED DESCRIPTION OF THE PREFERRED EMBODIMENTS

Embodiment 1

A recording medium according to embodiment 1 of the present invention is described with reference to the drawings. The recording medium described is an SD memory card. An SD memory card is ideal for describing the characteristics of the present invention because of the high level of confidentiality with which secure data can be stored.

Figure 1A:
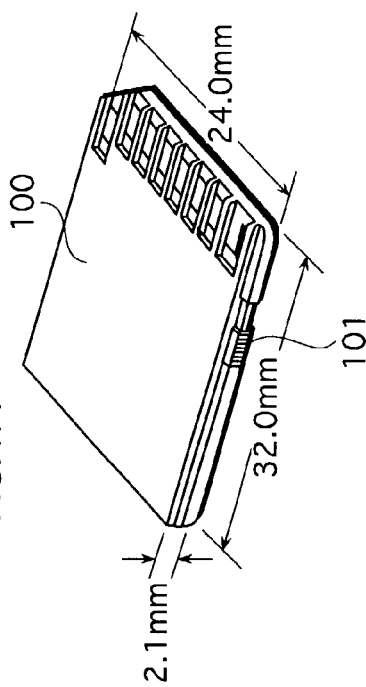
FIG. 1A shows an external view of an SD memory card 100 according to an embodiment 1 of the present invention.

FIG. 1A shows an external view of an SD memory card 100. SD memory card 100 has a length of 32.0 mm, a width of 24.0 mm, and a thickness of 2.1 mm. This postage stamp size allows SD memory card 100 to be easily handled. Nine connectors are provided on SD memory card 100 to facilitate contact with an apparatus, and on the side of SD memory card 100 is provided a protection switch 101 that allows a user to manually determine whether or not stored content can be rewritten.

Figure 1B:
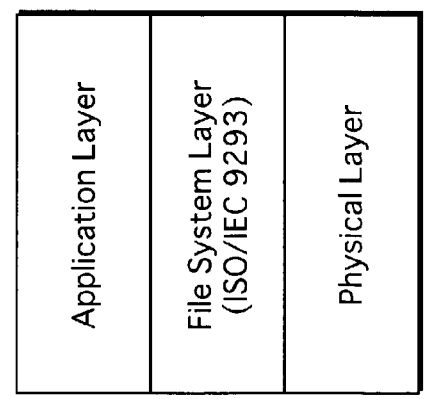
FIG. 1B shows structural layers in SD memory card 100.

FIG. 1B shows the structural layers of SD memory card 100. As shown in FIG. 1B, SD memory card 100 includes (i) a physical layer in which content is securely stored together with an encryption key and rights management information corresponding to the content, (ii) a file system layer which is accessed based on a file allocation table (FAT, ISO/IEC 9293), the smallest accessible unit being a cluster, and (iii) an application layer in which encrypted content comprising a copyrighted work is stored together with secure data.

Figure 1C:
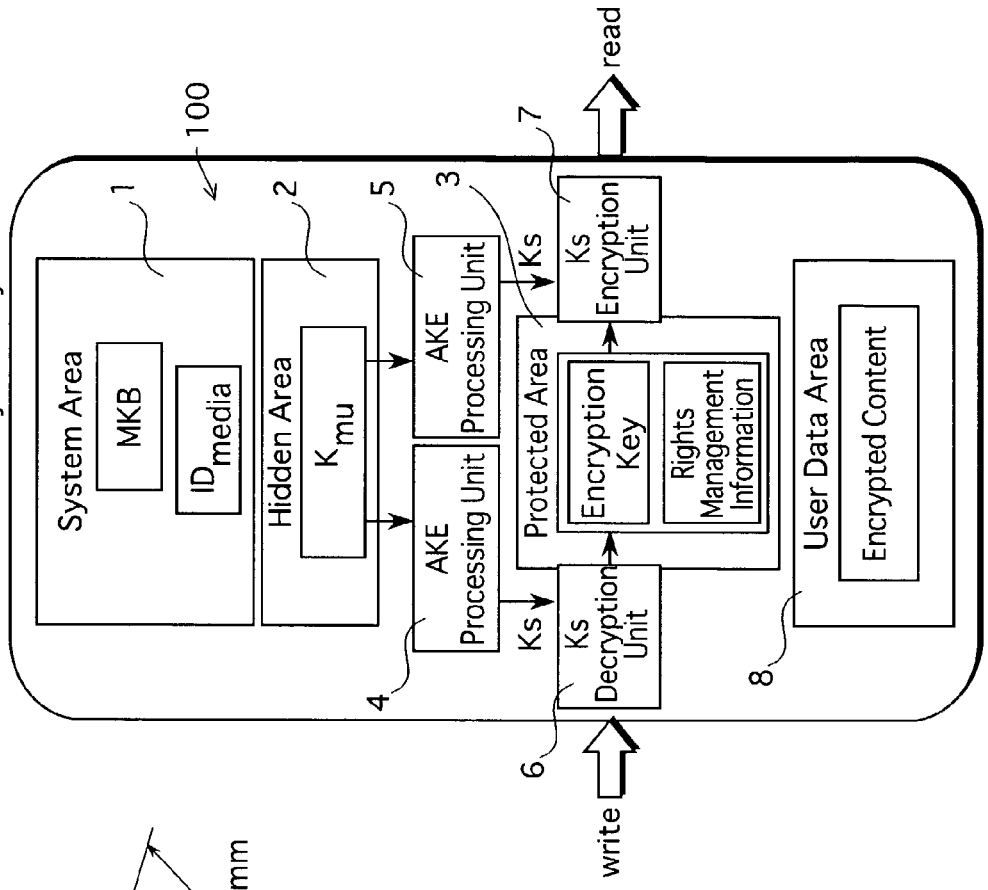
FIG. 1C shows a physical layer in SD memory card 100.

FIG. 1C shows a structure of the physical layer of SD memory card 100. As shown in FIG. 1C, the physical layer includes a system area 1, a hidden area 2, a protected area 3, an AKE processing unit 4, an AKE processing unit 5, a Ks decryption unit 6, a Ks encryption unit 7, and a user data area 8.

System area 1 is a read-only area storing a media key block (MKB), and a media ID, neither of which can be rewritten. An apparatus to which SD memory card 100 is connected is able to obtain an encryption key Kmu by reading the MKB and the media ID and correctly performing a predetermined operation using the read MKB and media ID in combination with a device key Kd belonging to the apparatus.

Hidden area 2 stores the valid encryption key Kmu, which is the encryption key obtained by the apparatus if the apparatus correctly performs the predetermined operation using the read MKB and media ID and a legitimate device key Kd.

Protected area 3 is part of a non-volatile memory (e.g. EEPROM) in SD memory card 100, and stores secure data such as encryption keys, rights management information, and the like.

Authentication & key exchange (AKE) units 4 and 5 conduct a "challenge response" form of mutual authentication between the apparatus and SD memory card 100 in order to mutually authenticate SD memory card 100 and the apparatus. If mutual authentication is not successful, processing is terminated, and if mutual authentication is successful, an encryption key (i.e. session key Ks) is shared between SD memory card 100 and the apparatus.

The authentication conducted by the apparatus consists of three phases: a first challenge phase, a first response phase, and a first verification phase. In the first challenge phase, the apparatus generates a random number, encrypts the generated random number using the obtained encryption key Kmu, and sends the encrypted random number to SD memory card 100 as a challenge value A. In the first response phase, SD memory card 100 uses the encryption key Kmu stored in hidden area 2 to decrypt challenge value A, and sends the obtained result to the apparatus as a response value B. In the first verification phase, the apparatus decrypts challenge value A using its encryption key Kmu, and compares the decrypted result with response value B sent from SD memory card 100.

The authentication conducted by SD memory card 100 also consists of three phases: a second challenge phase, a second response phase, and a second verification phase. In the second challenge phase, SD memory card 100 generates a random number, encrypts the generated random number using the encryption key Kmu stored in hidden area 2, and sends the encrypted random number to the apparatus as a challenge value C. In the second response phase, the apparatus uses its encryption key Kmu to decrypt challenge value C, and sends the obtained result to SD memory card 100 as a response value D. In the second verification phase, SD memory card 100 decrypts challenge value C using its encryption key Kmu, and compares the decrypted result with response value D sent from the apparatus.

If the apparatus uses an invalid encryption key Kmu in the mutual authentication process, the challenge values will not match their respective response values, and the mutual authentication process will be terminated as a result. On the other hand, if mutual authentication is confirmed, AKE units 4 and 5 perform an exclusive OR (XOR) operation using challenge values A and C, and encrypt the result using encryption key Kmu to obtain session key Ks.

If encrypted data is sent to SD memory card 100 from an apparatus to which SD memory card 100 is connected, Ks decryption unit 6 assumes that the encrypted data is secure data encrypted using session key Ks, and uses session key Ks to decrypt the encrypted data. Ks decryption unit 6 then assumes the secure data obtained as a result of decryption process to be legitimate, and writes the decrypted secure data into the protected area.

When a command to read secure data is outputted to SD memory card 100 from an apparatus to which SD memory card 100 is connected, Ks encryption unit 7 uses session key Ks to encrypt the secure data stored in the protected area, and outputs the encrypted secure data to the apparatus that issued the command.

User data area 8 is, like protected area 3, part of the non-volatile memory (e.g. EEPROM). However, unlike protected area 3, mutual authentication is not required for an apparatus to access user data area 8. Encrypted contents are stored in user data area 8. If an encryption key read from protected area 3 is legitimate, it can be used to decrypt the encrypted content stored in user data area 8. Since the reading/writing of data in protected area 3 depends on the encryption by Ks encryption unit 7 and decryption by Ks decryption unit 6, protected area 3 can only be accessed legitimately if an apparatus to which SD memory card 100 is connected conducts the AKE processing correctly.

Next, the structuring of files and directories in the SD memory card according to embodiment 1 is described.

Figure 2:
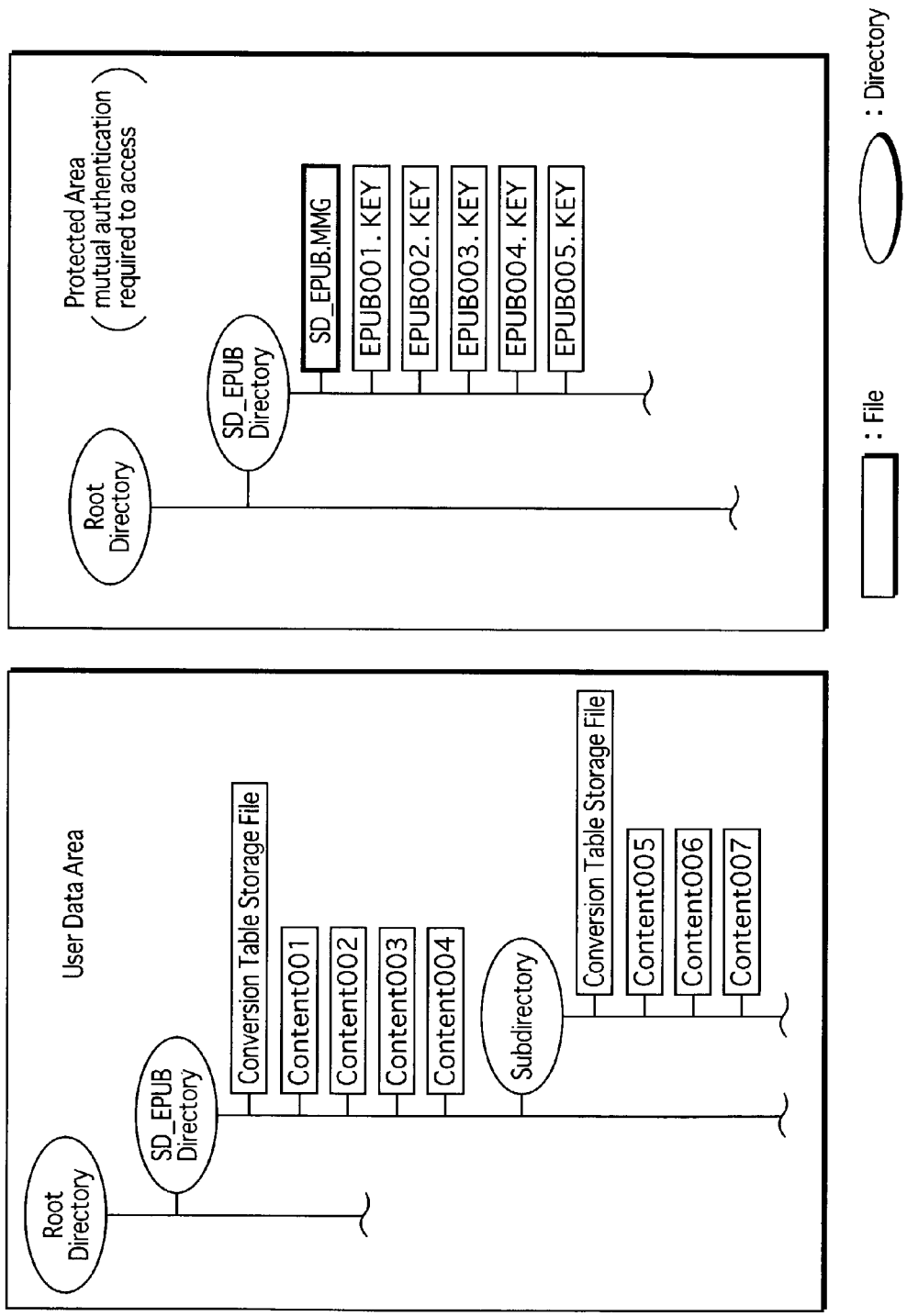
FIG. 2 shows files and directories in a user data area and a protected area of an SD memory card.

FIG. 2 shows files and directories in the user data area and the protected area of the SD memory card. The SD memory card of embodiment 1 is used to record content distributed by a contents distribution service. In the given example, the distributed content is an electronic publication. The "SD_E-PUB" in FIG. 2 shows that the content to be recorded on the SD memory card is an electronic publication. The electronic publication may be a daily newspaper or a weekly magazine. With electronic publications such as these, new content is distributed either daily or weekly, and thus in comparison to content such as music, this type of content becomes obsolete extremely quickly. Moreover, to distribute a publication, the publication is encrypted per article, per section, per paragraph, or per page using different encryption keys, and each of these encrypted parts are often treated as separate encrypted contents. If each article, section, paragraph, or page is treated as a separate content, the number of contents distributed at one time could be anywhere from thirty to forty. This means that the number of contents that the SD memory card is required to store will be very large. As such, the deleting of obsolete content and the writing of new content in the SD memory card of embodiment 1 will be conducted very frequently.

Next, the structure of files and directories in the protected area and user data area is described in detail. As shown on the right half of FIG. 2, the directories in the protected area are structured with a root directory on top, and an SD_EPUB directory below, and in the SD_EPUB directory is placed a master management file "SD_EPUB.MMG", and a plurality of secure data storage files "EPUB001.KEY", "EPUB002.KEY", "EPUB003.KEY", "EPUB004.KEY", and "EPUB005.KEY". The structure of directories in the user data area is shown on the left half of FIG. 2. A plurality of encrypted content storage files "Content001", "Content002", "Content003", and "Content004" is placed in the SD_EPUB directory in the user data area, and a plurality of encrypted content storage files "Content005", "Content006", and "Content007" is placed in the subdirectory below the SD_EPUB directory.

The secure data storage files will now be described. The filenames of the secure data storage files are "EPUB001.KEY", "EPUB002.KEY", "EPUB003.KEY", "EPUB004.KEY", and "EPUB005.KEY". The serial numbers"001", "002", "003", etc., in the filenames are file numbers that clearly identify each file in the protected area.

In the following description, "EPUBxxx.KEY" is used to refer to a generic secure data storage file identified by the file number "xxx". EPUBxxx.KEY files identified by the file numbers "001", "002", "003", and soon, will be referred to using the filenames "EPUB001.KEY", "EPUB002.KEY", "EPUB003.KEY", and so on, having the file numbers included therein.

FIG. 3 shows an internal structure of EPUBxxx.KEY. As shown in FIG. 3, EPUBxxx.KEY includes n number of Key&Rule Entry areas and a bitmap consisting of n number of bits.

The plurality of Key&Rule Entry areas (i.e. #1, #2, #3, #4, and so on) are allotted one-to-one to the plurality of encrypted contents recorded in the user data area, and are areas of a constant length that are written with secure data such as encryption keys and rights management information, each piece of which relates to a corresponding content. Rights management information is also referred to as usage conditions. For example, rights management information is used in managing the copyright relating to content by showing the conditions of use of the content. Since the exemplary content according to embodiment 1 is an electronic publication, "usage" here includes the reproduction and copying of the publication. An encryption key is information used to decrypt the content to be reproduced. In order to effectively manage the copyright of contents, encryption keys and rights management information must be stored with a high level of confidentiality, and for this reason they are recorded in encrypted form in the Key&Rule Entry areas. To facilitate the encryption process, each combination of an encryption key and a piece of rights management information must be of a constant length (e.g. 16-bytes, 32-bytes, 64-bytes), which is determined by the encryption method used. Because this combined length is constant, the length of each Key&Rule Entry area must also be constant.

Figure 4:
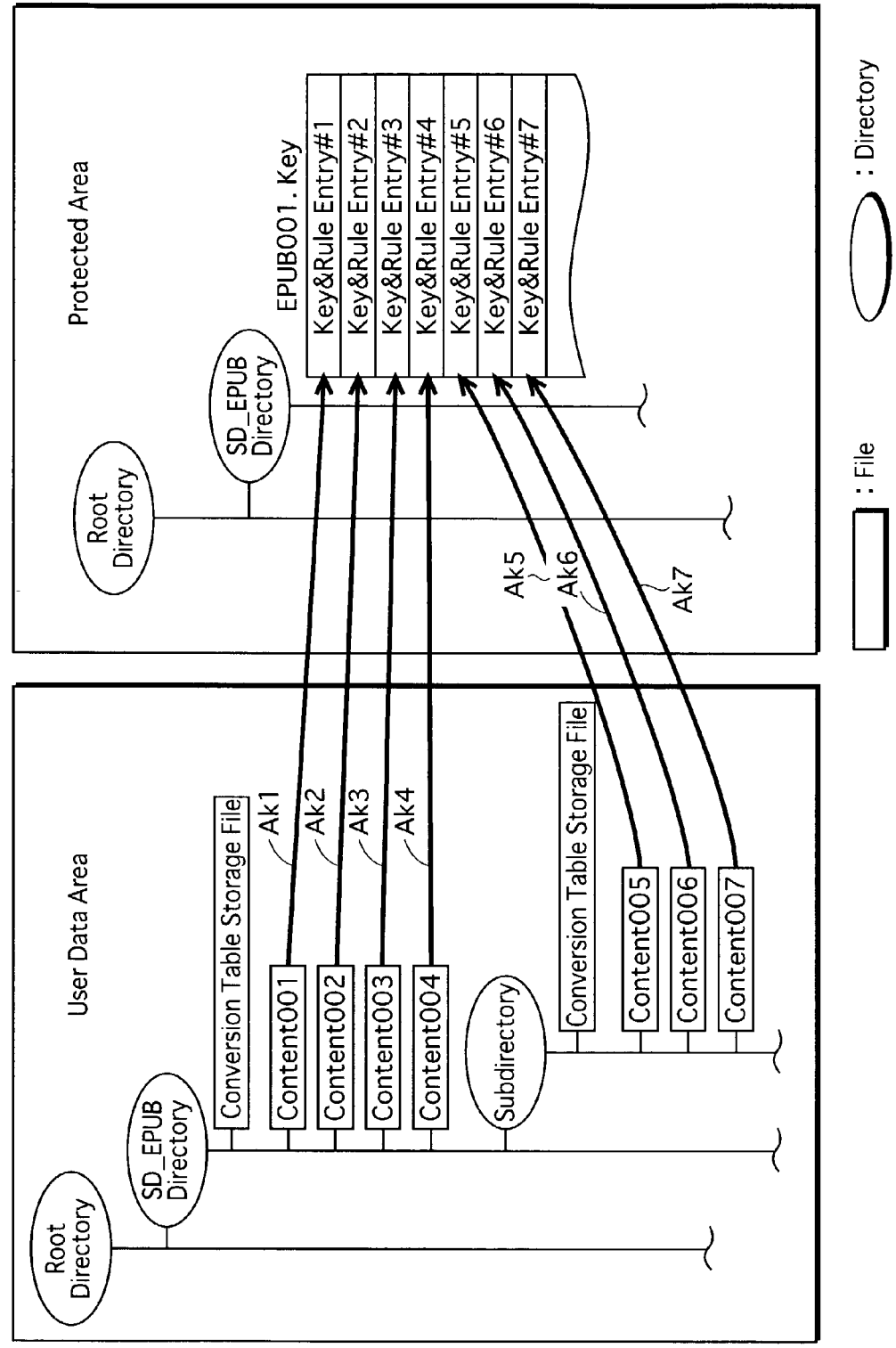
FIG. 4 shows the correspondence between a plurality of Key&Rule Entry areas in the protected area and a plurality of contents in the user data area.

The numbers (i.e. #1, #2, #3, and so on) in FIG. 3 are the local numbers of the Key&Rule Entry areas in EPUBxxx.KEY. FIG. 4 shows the correspondence between the plurality of Key&Rule Entry areas and a plurality of contents in the user data area. In FIG. 4, arrows Ak1 to Ak7 show which content corresponds to which Key&Rule Entry area. In other words, the arrows show Content001 as corresponding to secure data stored in Key&Rule Entry#1 (arrow Ak1), Content002 as corresponding to secure data stored in Key&Rule Entry#2 (arrow Ak2), Content003 as corresponding to secure data stored in Key&Rule Entry#3 (arrow Ak3), and so on. As mentioned above, the SD memory card of embodiment 1 is used to record distributed electronic publications, and thus content is deleted with great frequency. As a result, Key&Rule Entry areas corresponding to the contents constantly go from "in use" to "not in use".

Figure 5:
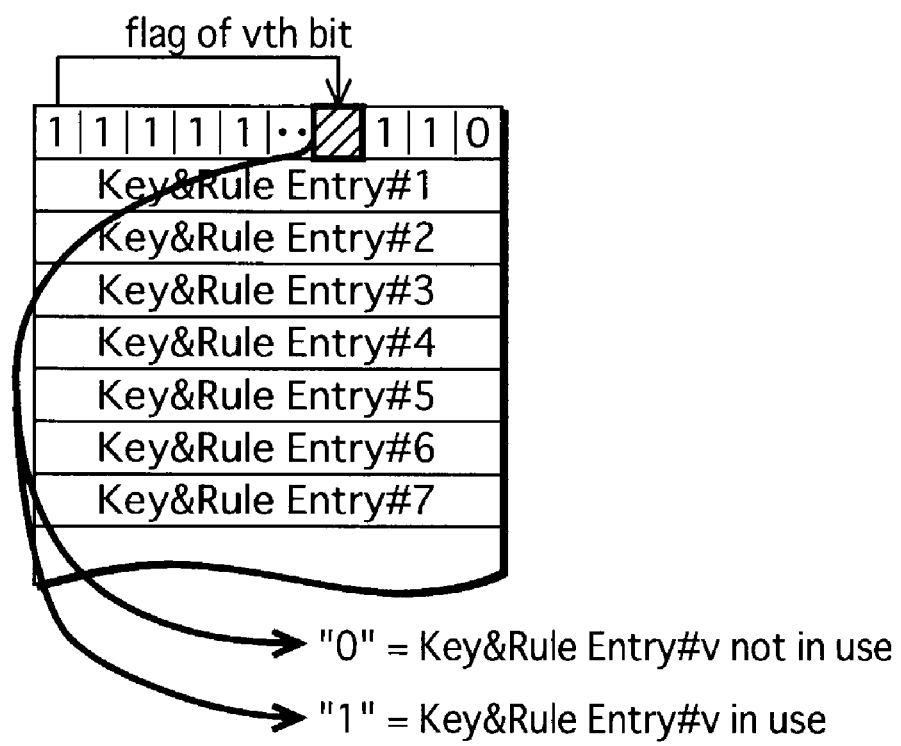
FIG. 5 shows an exemplary bitmap in an EPUBxxx.KEY file.

The n-bit bitmap in EPUBxxx.KEY is information that facilitates the management of the Key&Rule Entry areas, and consists of n number of 1-bit flags that correspond one-to-one with the n number of Key&Rule Entry areas. FIG. 5 shows an exemplary bitmap in EPUBxxx.KEY. In FIG. 5, the flag ($1 \leq v \leq n$) of the $v^{th}$ bit from the head in the n-bit bitmap shows the condition of the $v^{th}$ Key&Rule Entry area in EPUBxxx.KEY. The $v^{th}$ Key&Rule Entry area is identified by the local number "v", and is referred to as Key&Rule Entry#v. If the $v^{th}$ bit flag is "1", this shows that Key&Rule Entry#v is written with secure data, and is "in use". If the $v^{th}$ bit flag is "0", this shows that Key&Rule Entry#v is not written with secure data (i.e. either data yet to be written or data deleted), and is "not in use" or "empty". Thus by detecting a "0" flag nearest the head of the n-bit bitmap, designating this flag as the $v^{th}$ bit, and writing secure data into Key&Rule Entry#v, the writing of secure data is conducted in a manner that fills the empty areas scattered throughout the plurality of files.

Figure 6:
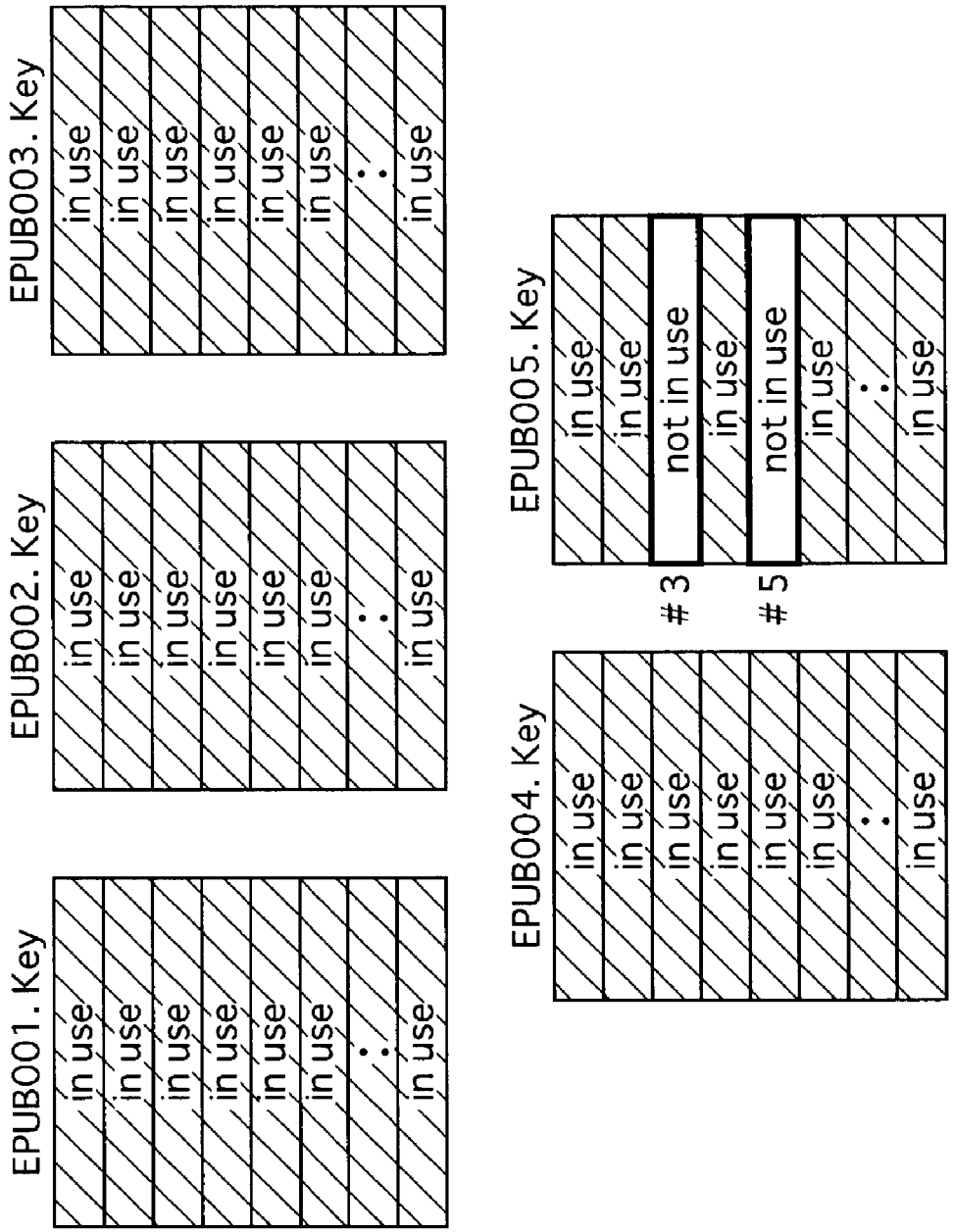
FIG. 6 shows in detail bitmap settings for a plurality of EPUBxxx.KEY files.

An exemplary setting of the n-bit bitmap in EPUBxxx.KEY is now described in detail. This exemplary bitmap setting is shown in FIG. 6. In the example, five files (i.e. EPUB001.KEY to EPUB005.KEY) are stored in the protected area. The hatched spaces in FIG. 6 mark the Key&Rule Entry areas currently in use, and the blank spaces mark the Key&Rule Entry areas currently not in use. As seen in FIG. 6, all the Key&Rule Entry areas in EPUB001.KEY to EPUB004.KEY are in use. In EPUB005.KEY, all Key&Rule Entry areas except for the third and fifth (i.e. Key&Rule Entry#3 and #5) are in use.

Figure 7:
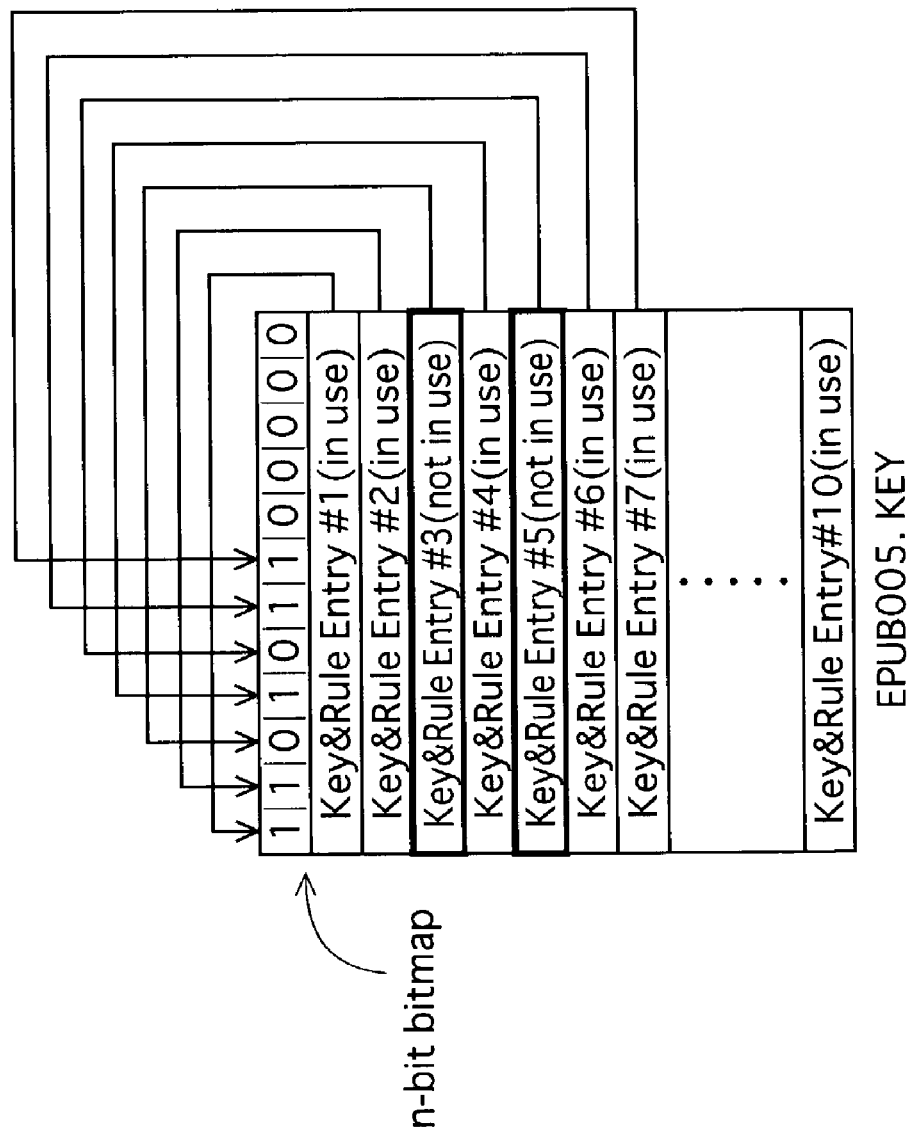
FIG. 7 shows in detail a bitmap setting for an EPUB005.KEY file when the Key&Rule Entry areas in EPUB005.KEY are set as in FIG. 6.

FIG. 7 shows the setting of the bitmap in EPUB005.KEY when the Key&Rule Entry areas in EPUB005.KEY are as in FIG. 6.

Since Key&Rule Entry#3 and Key&Rule Entry#5 in EPUB005.KEY are currently not in use, the flag of the $3^{rd}$ and $5^{th}$ bits in the n-bit bitmap of EPUB005.KEY are both "0". When secure data is to be written into EPUB005.KEY having the bitmap shown in FIG. 7, the search for a "0" flag nearest the head of the bitmap will yield the $3^{rd}$ bit in the bitmap, and the secure data will thus be written into Key&Rule Entry#3 corresponding to the $3^{rd}$ bit. This concludes the description of the EPUBxxx.KEY files. The SD_EPUB.MMG file is described next.

Figure 8:
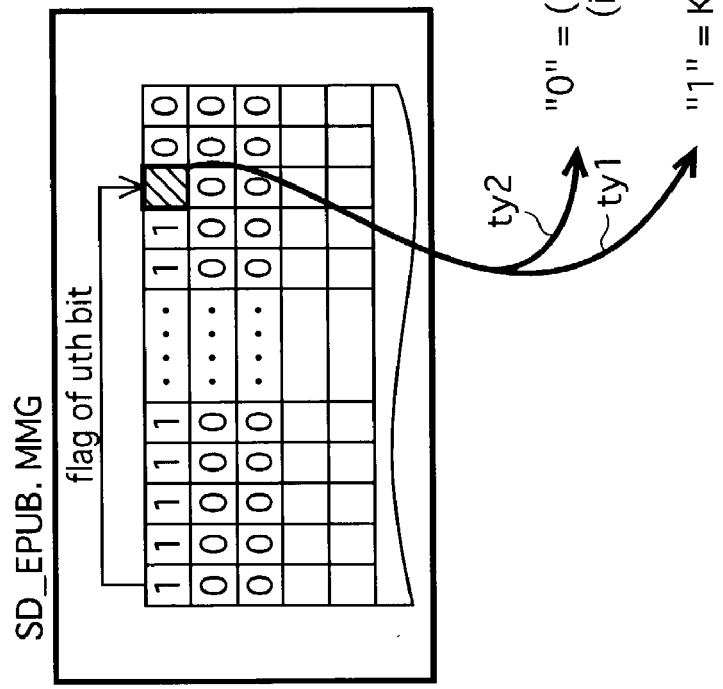
FIG. 8 shows a bitmap in an SD_EPUB.MMG file.

SD_EPUB.MMG is a master manager file and has a bitmap consisting of m number of 1-bit flags. The m number of bits corresponds to the total number of EPUBxxx.KEY files stored in the protected area. FIG. 8 shows the bitmap in SD_EPUB.MMG. In FIG. 8, the flag of the $u^{th}$ bit from the head of the bitmap is hatched. The flag ($1 \leq u \leq m$) of the $u^{th}$ bit shows the condition of the $u^{th}$ file from among the plurality of EPUBxxx.KEY files. The $u^{th}$ file is the EPUBxxx.KEY file identified by the file number "u", that is, EPUB#u.KEY. The two arrows, ty1 and ty2, in FIG. 8 show the two possible values (i.e. "0" or "1") of the flag of the $u^{th}$ bit. If the $u^{th}$ bit flag in the m-bit bitmap of SD_EPUB.MMG is "1" (arrow ty1), this shows that all the Key&Rule Entry areas in EPUB#u.KEY are currently in use. On the other hand, if the u bit flag in the m-bit bitmap of SD_EPUB.MMG is "0" (arrow ty2), this shows that (i) the EPUB#u.KEY file has at least one unused Key&Rule Entry area, or (ii) the EPUB#u.KEY file itself does not exist.

Thus, by searching for a "0" flag nearest the head of the SD_EPUB.MMG bitmap, designating this flag as the $u^{th}$ bit, and writing secure data into EPUB#u.KEY corresponding to the $u^{th}$ bit, the unused areas in the EPUBxxx.KEY files will be filled in an ascending order of the file numbers.

As mentioned above, if the $u^{th}$ bit flag in the SD_EPUB.MMG bitmap is "0", two conditions are possible: (i) EPUB#u.KEY has at least one unused Key&Rule Entry area, or (ii) EPUB#u.KEY itself does not exist. However, how do we determine which of these two conditions applies?

This problem is easily solved by referring to the directory entry of the directory in which EPUB#u.KEY is placed. If EPUB#u.KEY exists, one would naturally expect to find a filename "EPUB#u.KEY" identified by the file number "u" in the directory entry. If this filename does exist, the "0" flag of the uth bit shows that EPUB#u.KEY has at least one unused Key&Rule Entry area. In contrast, if this filename is not in the directory entry, the "0" flag of the uth bit shows that EPUB#u.KEY itself does not exist. In this way, the two possible conditions shown by the "0" flag of the uth bit can be clearly distinguished merely by searching the directory entry for the filename "EPUB#u.KEY".

Figure 9:
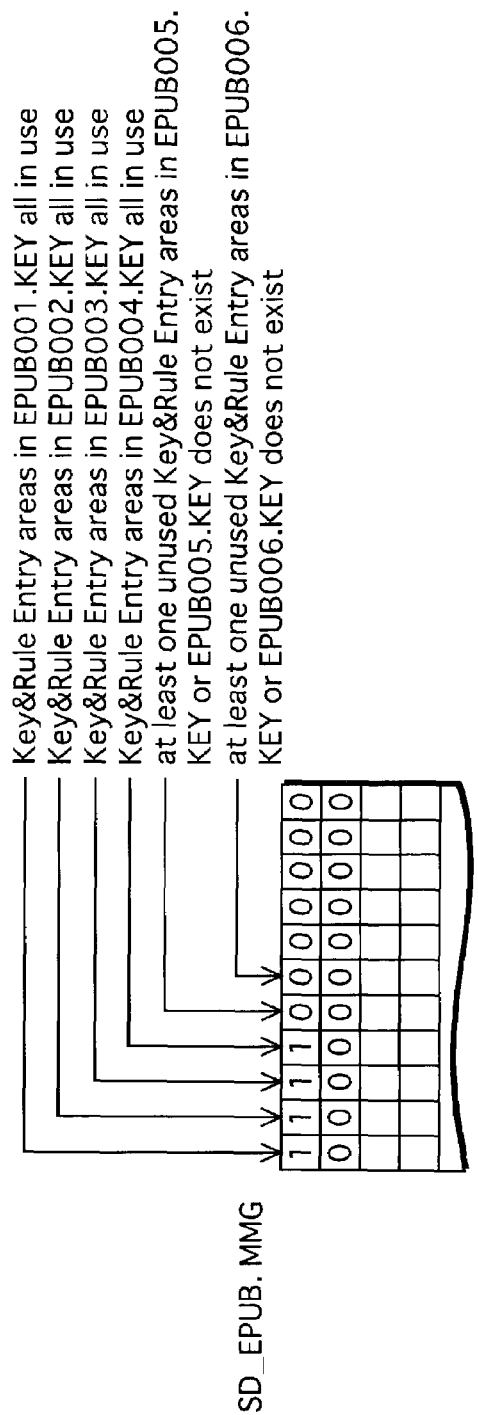
FIG. 9 shows in detail a bitmap setting in SD_EPUB.MMG when the Key&Rule Entry areas in the EPUBxxx.KEY files are set as in FIG. 6.

An exemplary setting of the bitmap in SD_EPUB.MMG is now described in detail. The exemplary setting is the same as that in FIG. 6. FIG. 9 shows the setting of the bitmap in SD_EPUB.MMG when EPUB001.KEY to EPUB005.KEY are as in FIG. 6. Since there are five files stored in the protected area, the flag of bits higher in the bitmap than the fifth bit (i.e. $6^{th}$ bit, $7^{th}$ bit, $8^{th}$ bit, . . . ) are all "0", which shows that the files corresponding to these bits (i.e. EPUB006.KEY and above) do not exist. Furthermore, since all the Key&Rule Entry areas included in EPUB001.KEY to EPUB004.KEY are currently in use, the first to fourth bits in the bitmap in SD_EPUB.MMG are all "1". As the third and fifth Key&Rule Entry areas (i.e. Key&Rule Entry#3 and #5) in EPUB005.KEY are currently not in use, the $5^{th}$ bit in the SD_EPUB.MMG bitmap corresponding to EPUB005.KEY is "0". In the exemplary directory entry setting shown in the lower half of FIG. 9, files EPUB001.KEY to EPUB005.KEY are provided. This directory entry contains the filenames and extensions of EPUB001.KEY to EPUB005.KEY as well as the respective dates/times of when secure data was written into these files. Since files EPUB006.KEY and above do not exist, filenames corresponding to these files are not shown in the directory entry. Thus, by referring to both the directory entry and the SD_EPUB.MMG bitmap it is possible to quickly determined that EPUB005.KEY has at least one Key&Rule Entry area that is currently not in use.

By searching for a "0" flag nearest the head of the SD_EPUB.MMG bitmap, designating this flag as the $u^{th}$ bit, and opening EPUB#u.KEY corresponding to the $u^{th}$ bit, only a single access of the protected area is required to open EPUB005.KEY having at least one unused Key&Rule Entry area.

However, one question remains unanswered: If the SD_EPUB.MMG bitmap must be updated after each writing of new secure data, doesn't this increase the number of times that the semiconductor memory card is rewritten, and thereby shorten the lifespan of the SD memory card? It is certainly true that the number of possible rewritings with respect to an SD memory card is limited to several hundreds of thousands of times, and that updating the SD_EPUB.MMG bitmap subsequent to new secure data being recorded does reduce the remaining number of possible rewritings. So let us then investigate the actual number of times that the SD_EPUB.MMG bitmap requires updating.

If the number of Key&Rule Entry areas in each EPUBxxx.KEY file is ten, for example, the $u^{th}$ bit in the SD_EPUB.MMG bitmap need merely be maintained at a "0" value, irrespective of whether there are nine unused Key&Rule Entry areas in EPUB#u.KEY or only one unused Key&Rule Entry area in EPUB#u.KEY. In other words, the bitmap in SD_EPUB.MMG will not require updating until all ten of the Key&Rule Entry areas have been written. Thus, only one update of the SD_EPUB.MMG bitmap is required for every ten or more updates of the bitmap in EPUB#u.KEY. Likewise, if there are one hundred Key&Rule Entry areas in each EPUBxxx.KEY file, then only one update of the SD_EPUB.MMG bitmap is required for every hundred or more updates of the bitmap in EPUB#u.KEY, and if two hundred Key&Rule Entry areas, then one m-bit bitmap update for every two hundred or more n-bit bitmap updates. As a result, the lifespan of the area in which SD_EPUB.MMG is placed is not unduly shortened.

The conversion table storage file in the user data area is now described in detail. The conversion table storage file shows which content corresponds to which Key&Rule Entry area, or more specifically, it shows the one-to-one correspondence between the id number of each content (e.g. 001, 002, etc) and a global number calculated for each Key&Rule Entry area. The global number "s" of a Key&Rule Entry area is calculated using the following equation, where "u" is the file number of the EPUBxxx.KEY file, "v" is the local number of the Key&Rule Entry area, and "n" is the number of Key&Rule Entry areas in EPUBxxx.KEY.

$$s = n \cdot (u-1) + v \qquad \text{Equation 1:}$$

Figure 10:
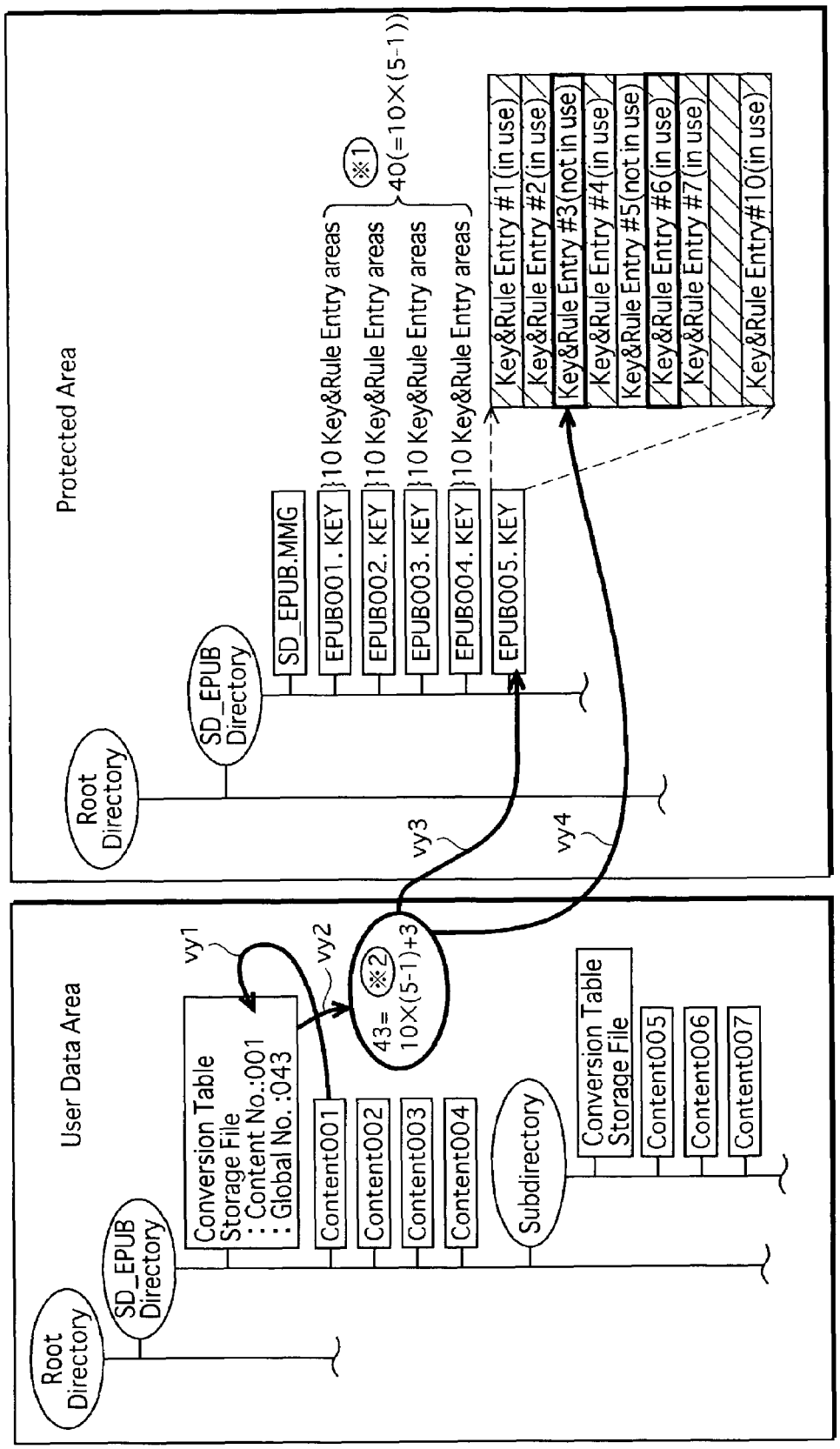
FIG. 10 shows the setting of a conversion table storage file when Key&Rule Entry#3 in EPUB005.KEY corresponds to Content001.

FIG. 10 shows the setting of the conversion table storage file when Key&Rule Entry#3 in EPUB005.KEY (see FIG. 6) corresponds to Content001. Since there are ten Key&Rule Entry areas in each of EPUB001.KEY to EPUB005.KEY (i.e. n=10), n·(u−1) becomes 10·(5−1)=40 (as shown by note ※1 in FIG. 10). Furthermore, since secure data is to be written into Key&Rule Entry#3 in EPUB005.KEY, the local number #v is "3" (i.e. v=3).

Thus, equation 1 is 10·(5−1)+3=43. That is, the global number #s of Key&Rule Entry#3 is calculated to be "43". Since Content001 corresponds to Key&Rule Entry#3 in the example, the conversion table storage file in the directory storing Content001 is set to show id number "001" of Content001 as corresponding to global number "43" of Key&Rule Entry#3. Thus, Key&Rule Entry#3 in EPUB005.KEY can be quickly traced from the id number "001" of Content001. Arrows vy1 to vy4 in FIG. 10 show the process by which a Key&Rule Entry area in an EPUBxxx.KEY file is specified from a content id number. As shown in note ※2 in FIG. 10, global number "43" (arrow vy2) leads to file number "5" (arrow vy3) and local number "3" (arrow vy4), and as a result Key&Rule Entry#3 in EPUB005.KEY is accessed.

In embodiment 1 as described above, the in-bit bitmap in SD_EPUB.MMG shows which of a plurality of EPUBxxx.KEY files has Key&Rule Entry areas that are not in use. Thus by referring to the bitmap in SD_EPUB.MMG, files having "empty" areas can be quickly specified, even if the unused areas lie scattered throughout the plurality of files. Furthermore, since only two file access operations are required to specify EPUB#u.KEY having an unused Key&Rule Entry area (i.e. once to open SD_EPUB.MMG, and once again to open EPUB#u.KEY), the apparatus accessing the SD memory card does not have to open a plurality of EPUBxxx.KEY files in order to specify EPUB#u.KEY, and as a result the time required to write new content can be shortened.

Embodiment 2

In embodiment 2, the number of Key&Rule Entry areas to be provided in a single file is determined. The number of EPUBxxx.KEY files (i.e. "m") and the number of Key&Rule Entry areas (i.e. "n") are set at values that satisfy the following two equations, where "size" is the size of an Key&Rule Entry area, and "SC" is the size of a cluster.

$$SC \geq n \times size + n \qquad \text{Equation 2}$$

$$SC \geq m \qquad \text{Equation 3}$$

In equation 2, "n×size" is the size occupied in EPUBxxx.KEY by the n number of Key&Rule Entry areas, and "n" is the size occupied in EPUBxxx.KEY by the bitmap. The fact that the sum of these two values must be less than or equal to the size of a cluster shows that EPUBxxx.KEY is structured as a file formed from a single cluster. In equation 3, the "m" value is the size of the bitmap in SD_EPUB.MMG. The fact that "m" must be less than or equal to the size of a cluster shows that SD_EPUB.MMG is also structured as a file formed from a single cluster.

Figure 11A:
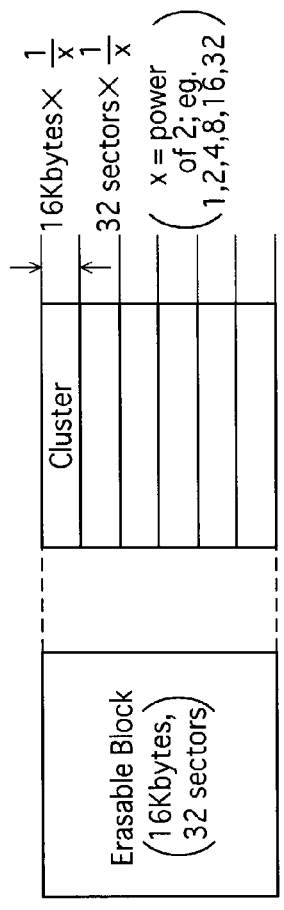
FIG. 11A shows SD_EPUB.MMG and EPUB001.KEY~EPUB005.KEY as each being formed from a single cluster according to an embodiment 2 of the present invention.

If "m" and "n" are set so as to satisfy the above equations, SD_EPUB.MMG and the plurality of EPUBxxx.KEY files described in embodiment 1 can each be structured as files formed from a single cluster. FIG. 11A shows SD_EPUB.MMG and the plurality of EPUBxxx.KEY files as each being files formed from a single cluster. In FIG. 11A, six clusters (i.e. Cluster001 to Cluster006) are shown. Of these six clusters, SD_EPUB.MMG is recorded in Cluster001, and EPUB001.KEY to EPUB005.KEY are recorded in Cluster002 to Cluster006, respectively. In other words, each cluster is allotted a single file.

How then does one determine the value at which to set the size of a cluster? A cluster is a unit of management area in the file system layer, and a single cluster is always occupied by a single file. The smallest writable unit in the physical layer of an SD memory card is often predetermined. This minimum unit is known as an "erasable block". In the following description, an erasable block composed of 32 sectors (16 Kbytes) is given as an example. If the SD memory card is structured to include erasable blocks, each erasable block to be written must be returned to a blank state before being written. As such, the relationship between clusters and erasable blocks is an important consideration in determining cluster size.

Figure 11B:
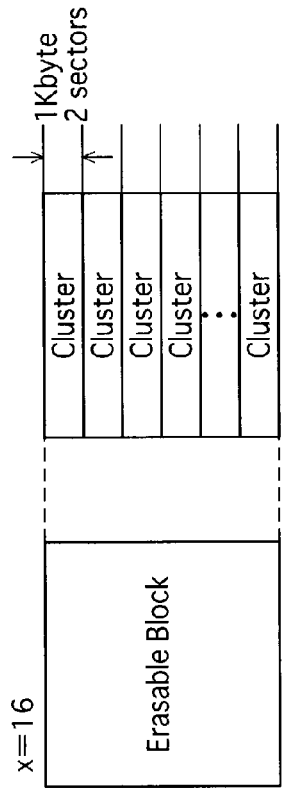
FIG. 11B shows a relationship between an erasable block and one or more clusters.
Figure 11C:
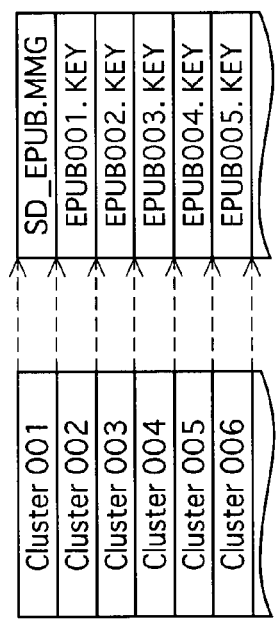
FIG. 11C shows an erasable block-cluster relationship when x=1.
Figure 11D:
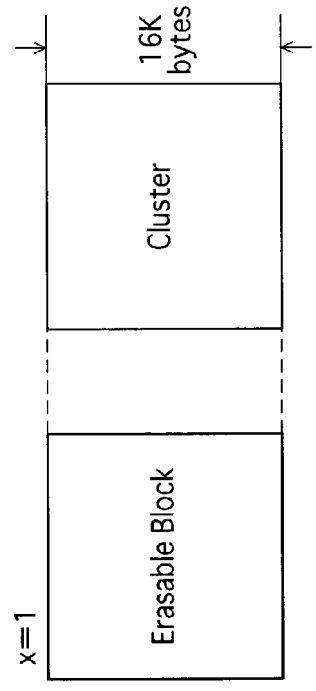
FIG. 11D shows an erasable block-cluster relationship when x=16.

Given this fact, the size of a single cluster according to embodiment 2 is set at 1/x the size of a single erasable block. FIG. 11B shows the relationship between an erasable block and one or more clusters. Cluster size is determined to be 1/x of the 16 Kbytes (i.e. 1/x of the 32 sectors) of a single erasable block. FIG. 11C shows clusters when x=1. FIG. 11D shows clusters when x=16.

In embodiment 2 as described above, the size of a cluster is determined to be 1/x the size of an erasable block, and the number of Key&Rule Entry areas ("n") and the number of EPUBxxx.KEY files ("m") is determined such that each file (i.e. SD_EPUB.MMG or EPUBxxx.KEY) is contained within a single cluster. Thus, when an EPUBxxx.KEY file or SD_EPUB.MMG requires updating, the number of erasable blocks that need to be rewritten is minimized, and the lifespan of the erasable blocks is not unduly shortened.

Embodiment 3

Disclosed in embodiment 3 is a technique for avoiding a single cluster being positioned so as to straddle the boundary between two erasable blocks when there is a change in volume management information.

FIG. 12A shows a formatting of the protected area. Since the protected area is managed using a file system, an area for volume management information is provided at the start of the protected area, and a file area is provided following the volume management information. The volume management information conforms to ISO/IEC 9293, and is formed from a master boot record & partition table sector, a partition boot sector, duplicate file allocation tables (FATs), and a root directory entry. The duplicate FATs correspond to the plurality of clusters included in the protected area, and show the link between individual clusters. As mentioned above, the file area is placed immediately after the volume management information. SD_EPUB.MMG and the plurality of EPUB-xxx.KEY files described in embodiment 1 are provided in this file area. As shown in FIG. 12A, the plurality of clusters in FIG. 11A (i.e. clusters 001, 002, 003, . . . , storing SD_EPUB.MMG, EPUB001.KEY, EPUB002.KEY, EPUB003.KEY, . . . ) are stored in the file area.

Since the duplicate FATs are the cause of a change in the volume management information, they will now be described in detail. The duplicate FATs consist of two FATs, each of which conforms to ISO/IEC 9293. Each FAT is formed from a plurality of FAT entries that correspond one-to-one with the clusters. Each FAT entry shows whether a corresponding cluster is "in use" or "not in use". If "in use" the FAT entry shows the cluster number of clusters linked to the cluster in use. If "not in use", the FAT entry shows a "0" value.

Next, the cause of a change in the volume management information is described. During the process of storing data in the protected area, there are many opportunities for a user or a recording apparatus to determine the data size of the protected area. If the size of the protected area is changed in response to a user request, the number of clusters included in the protected area increases or decreases accordingly. If the number of clusters increases or decreases, the size of the FAT formed from FAT entries corresponding to these clusters also increases or decreases, which results in increases or decreases in the size of the volume management information that includes the FAT. If the size of the volume management information changes, the start address of the file area following the volume management information will also change. Since the start address of the file area changes in response to a change in the size of the protected area, the start address of individual clusters included in the file area will, of course, also change in response to a change in the size of the protected area.

If the start address of a cluster changes in response to a change in the size of the protected area, it is possible that the cluster will be placed so as to straddle the boundary between two erasable blocks, or that the end section of the volume management information and a cluster positioned at the start of the file area will be placed in the same erasable block.

In order to avoid the occurrence of such undesirable effects, an ameliorative measure is proposed in embodiment 3 that complements the ameliorative measure mentioned in embodiment 2.

In this second ameliorative measure, an area equivalent to y number of clusters is allotted to the storage of volume management information in the protected area. FIG. 12B shows the equivalent of y number out of a total of s·x number of clusters in s number of erasable blocks being allotted to the storage of volume management information. By allotting the equivalent of y number of clusters to the storage of volume management information, y/x parts of the total internal area of the s number of erasable blocks will be occupied by volume management information, while the remaining (s·x−y)/x parts of the internal area will be allocated as the file area.

By setting the size of the volume management information to an area equivalent to y number of clusters, the volume management information and s·x−y number of clusters are fitted within s number of erasable blocks, and clusters will not be placed so as to straddle the boundary between two erasable blocks.

FIG. 12C shows the allotment of clusters to the storage of volume management information when x=1, and FIG. 12D shows the allotment of clusters to the storage of volume management information when x=16. As shown in FIGS. 12C and 12D, one or more clusters are fitted within each erasable block by setting the volume management information, and as a result none of the clusters are placed so as to straddle the boundary between two erasable blocks.

Figure 13:
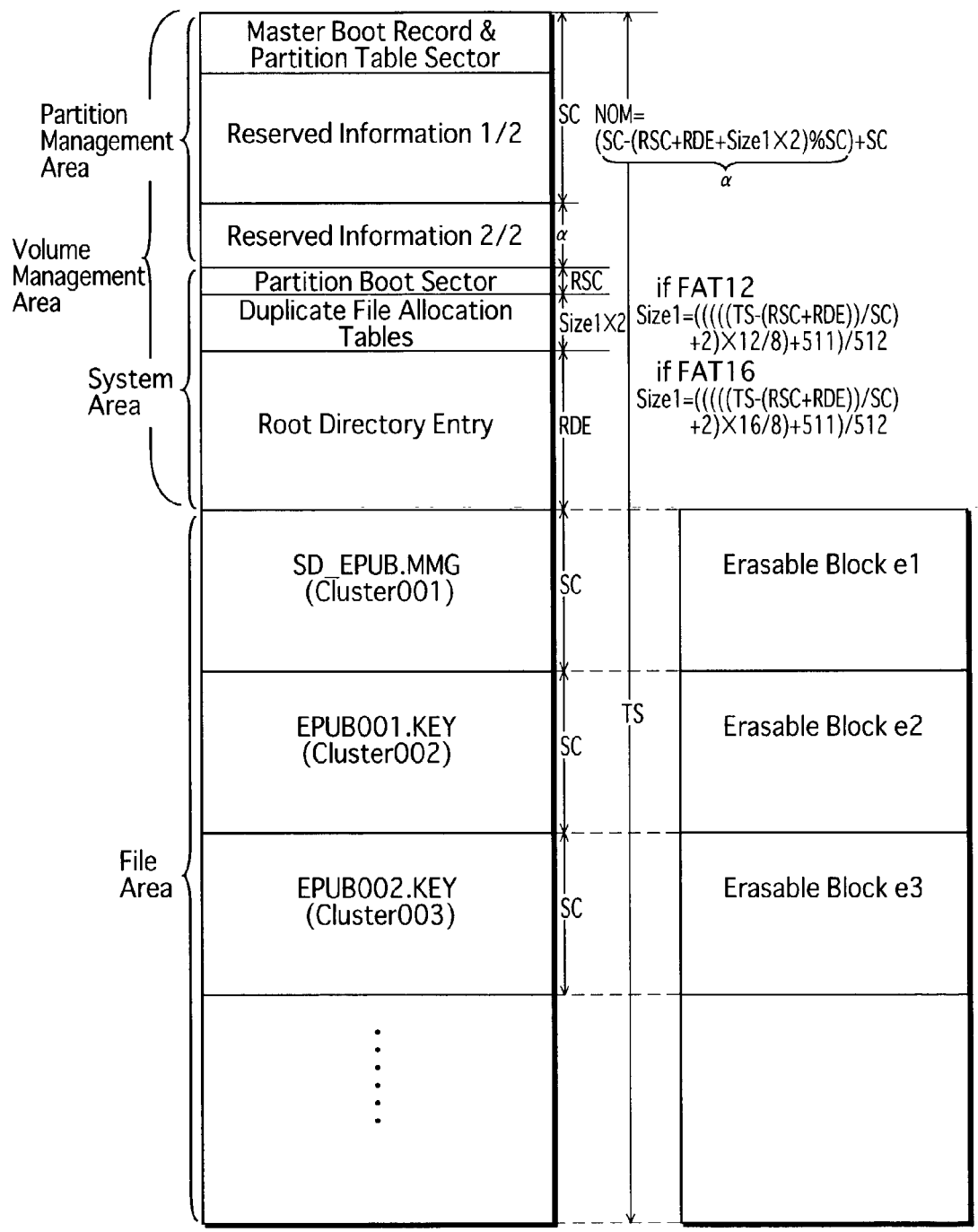
FIG. 13 shows a detailed layout of the protected area after size adjustment.

FIG. 13 shows a detailed layout of the protected area when adjustments have been to the size. In FIG. 13, the partition management area stores the master boot record & partition table sector, and the system area stores the partition boot sector, the duplicate FATs, and the root directory entry. In FIG. 13, "NOM" is the size of the partition management area, "RSC" is the size of the partition boot sector, "Size1× 2" is the size of the duplicate FATs, "RDE" is the size of the root directory entry, "TS" is the aggregate size of the sectors, and "SC" is the number of sectors included in a single cluster.

In FIG. 13, Size1 of a FAT included in the duplicate FATs depends on the value of TS. Size1 is calculated using the following formula 11.

$$FAT12: Size1 = ((((TS-(RSC+RDE))/SC)+2) \times 12/8) + 511)/512$$

$$FAT16: Size1 = ((((TS-(RSC+RDE))/SC)+2) \times 16/8) + 511)/512 \quad \text{Formula 11}$$

A FAT12 is a FAT in which each FAT entry is allotted a size of 12 bytes, and a FAT16 is a FAT in which each FAT entry is allotted a size of 16 bytes.

In formula 11, (TS-(RSC+RDE))/SC is the number of clusters required for storage of the file area. The byte length of the FAT is calculated by adding an indicator of "2" to (TS-(RSC+RDE))/SC, multiplying by the byte length of a FAT entry (i.e. 12 or 16), and dividing by "8". Finally, the number of sectors required to store a single FAT is calculated by adding the 511-byte offset value to the result of (((TS−(RSC+RDE))/SC)+2)×12/8), and dividing by the 512-byte sector length.

Of particular note in FIG. 13 is the "NOM" value, which is the size of the partition management area. NOM is set at a value of "SC+α" to ensure that the partition management area and the system area are stored in different clusters.

The "α" value in "SC+α" is set by dividing (RSC + RDE+Size1×2) by SC and subtracting the result from SC. This ensures that the sum of RSC, Size1×2, and RDE is an integer multiple of SC. As such, NOM is calculated using formula 12.

$$NOM=(SC-(RSC+RDE+Size1\times2)/SC)+SC \quad \text{Formula 12}$$

By determining the α value in this way, the partition management area and the file area are contained neatly within a plurality of erasable blocks. Moreover, the boundary between the system area and the file area coincides with a boundary between two erasable blocks, and as a result the boundaries between all subsequent clusters will also coincide with the boundary between two erasable blocks.

In FIG. 13, SD_EPUB.MMG, EPUB001.KEY, and EPUB002.KEY are recorded in Cluster001, Cluster002, and Cluster003 respectively. Since x=1 as mentioned above, clusters 001 to 003 correspond to erasable blocks e1 to e3, respectively. If SD_EPUB.MMG and EPUB001.KEY having an unused Key&Rule Entry are read, only the two erasable blocks e1 and e2 containing the two files need be read. Likewise, if SD_EPUB.MMG and EPUB001.KEY having an unused Key&Rule Entry are to be rewritten, only the two erasable blocks e1 and e2 containing the two files need be rewritten. Since the number of erasable blocks that require reading or writing (i.e. two) is minimized, the lifespan of the non-volatile memory is not unduly shortened.

In embodiment 3 as described above, the boundary between clusters can be set to coincide with the boundary between erasable blocks, even if there is a change in the size of the volume management information, and as a result the rewriting of clusters can be completed in a short period of time. Moreover, it is also possible to reduce the number of times that an erasable block requires erasing.

Embodiment 4

Figure 14A:
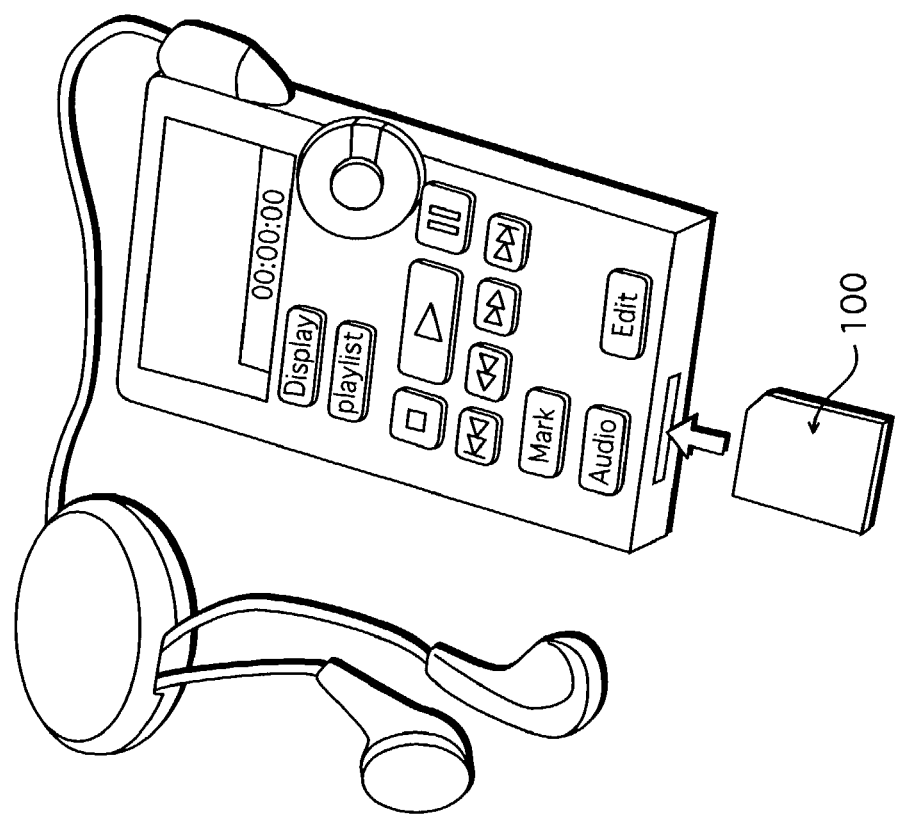
FIG. 14A shows a recording apparatus as a piece of general-purpose audio equipment.
Figure 14B:
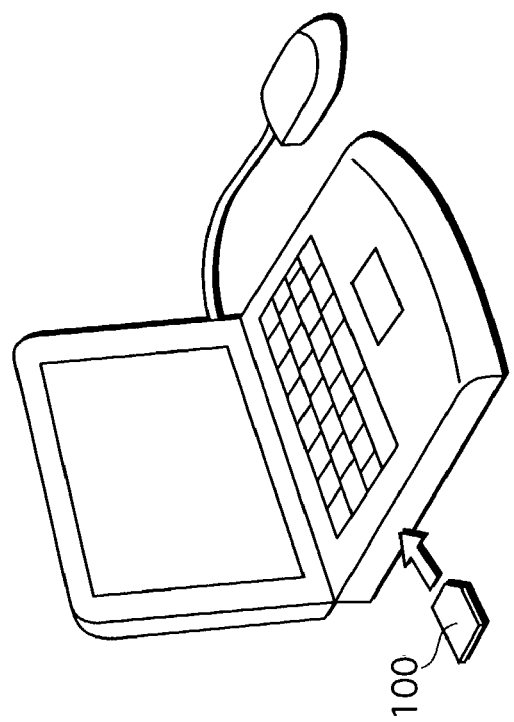
FIG. 14B shows a recording apparatus as a computer or similar piece of information equipment.
Figure 15:
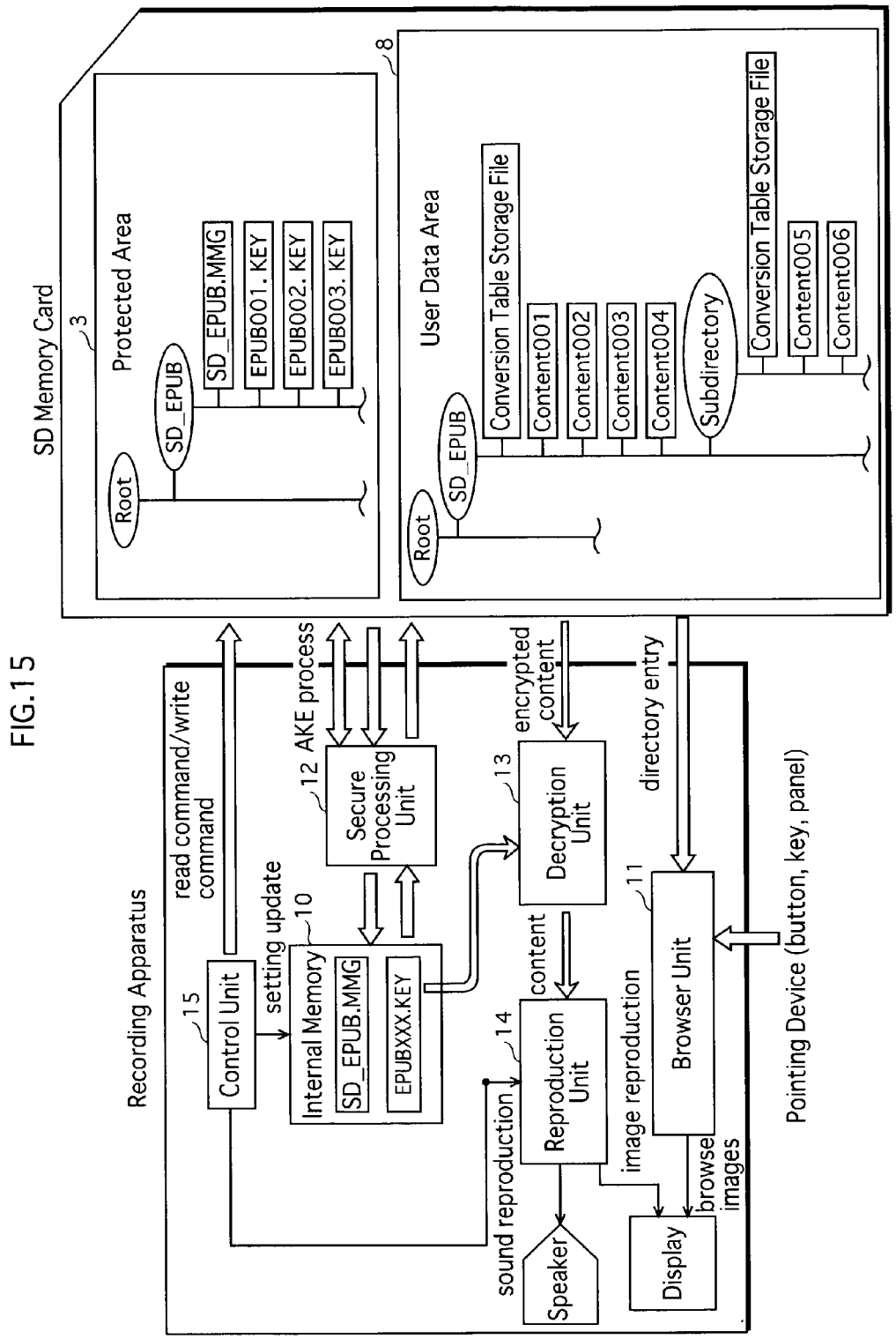
FIG. 15 shows an internal structure of a recording apparatus according to an embodiment 4 of the present invention.

Embodiment 4 relates to an apparatus for conducting recording processing and reproduction processing with respect to an SD memory card as disclosed in embodiments 1 to 3. For convenience, the apparatus that performs these processing operations will be referred to hereafter as a "recording apparatus". The recording apparatus may, for example, be a piece of general-purpose audio equipment as shown in FIG. 14A, or a piece of information equipment such as a computer as shown in FIG. 14B. The recording apparatus of embodiment 4 functions to write encrypted contents and secure data relating to the encrypted contents into the SD memory card. Reproduction of the encrypted contents is limited to a predetermined number of times, and included in the secure data is an encryption key to be used for decrypting the encrypted contents, and permitted reproduction number information showing the permitted number of times the contents may be reproduced. An internal structure of a recording apparatus that functions to read/write the encryption key and the permitted reproduction number information will now be described. FIG. 15 shows the internal structure of the recording apparatus according to embodiment 4. The recording apparatus shown in FIG. 15 includes an internal memory 10, a browser unit 11, a secure processing unit 12, a decryption unit 13, a reproduction unit 14, and a control unit 15.

Internal memory 10 is dynamic random access memory (DRAM) or synchronous dynamic random access memory (SDRAM) that stores the SD_EPUB.MMG and/or EPUB#u.KEY read from the protected area of the SD memory card. If a Key&Rule Entry area in EPUB#u.KEY is rewritten or the setting of the bitmap in EPUB#u.KEY is updated, EPUB#u.KEY is read in internal memory 10 and the rewriting or setting change conducted, after which the updated EPUB#u.KEY is written from internal memory 10 back into the protected area of the SD memory card. Similarly, if the bitmap setting in SD_EPUB.MMG is to be changed, SD_EPUB.MMG is read in internal memory 10 and the setting change conducted, after which the updated SD_EPUB.MMG is written from internal memory 10 back into the protected area. The rewriting of EPUB#u.KEY and SD_EPUB.MMG is conducted in internal memory 10 of the recording apparatus because the access speed of DRAM or SDRAM is considerably greater than the access speed of memory in the SD memory card, making it far more efficient to update the files in this way rather than directly updating the SD memory card. The process of reading the EPUB#u.KEY and SD_EPUB.MMG files from the SD memory card and placing them in internal memory 10 is referred to as "file open processing". If the EPUB#u.KEY and SD_EPUB.MMG files do not exist, the recording apparatus conducts file creation processing to create these files in internal memory 10.

Browser unit 11, in addition to displaying the contents stored in the file area of the SD memory card, functions to receive an instruction from a user relating to a target content to be reproduced or deleted. Reception of the user instruction is conducted by detecting an operation by a user of a button, key, touch panel, or similar pointing device included as part of the recording apparatus.

Secure processing unit 12 conducts mutual authentication processing with AKE processing unit 4, AKE processing unit 5, Ks decryption unit 6, and Ks encryption unit 7 in the SD memory card prior to any reading or writing of data with respect to the protected area. If mutual authentication cannot be verified, initiation of the reading/writing of data by the recording apparatus is immediately cancelled. The requirement that the recording apparatus and the SD memory card mutually authenticate each other before secure data stored in the protected area of the SD memory card can be read or written allows for the confidentiality of the secure data to be maintained. The writing or reading of data based on the precondition of mutual authentication by secure processing unit 12 is referred to respectively as "secure writing" and "secure reading".

Decryption unit 13 uses an encryption key provided in the Rule&Key Entry area read from internal memory 10 to decrypt the encrypted content targeted for reproduction.

Reproduction unit 14 reproduces the decrypted content. Reproduction unit 14 also measures the time since the start of the reproduction, and notifies control unit 15 if the reproduction time exceeds a predetermined threshold. The threshold equals the minimum time period considered necessary for a single reproduction of the content. By notifying control unit 15 that this time period has been exceeded, reproduction unit 14 prompts control unit 15 to decrement by one the permitted number of reproductions.

Figure 16:
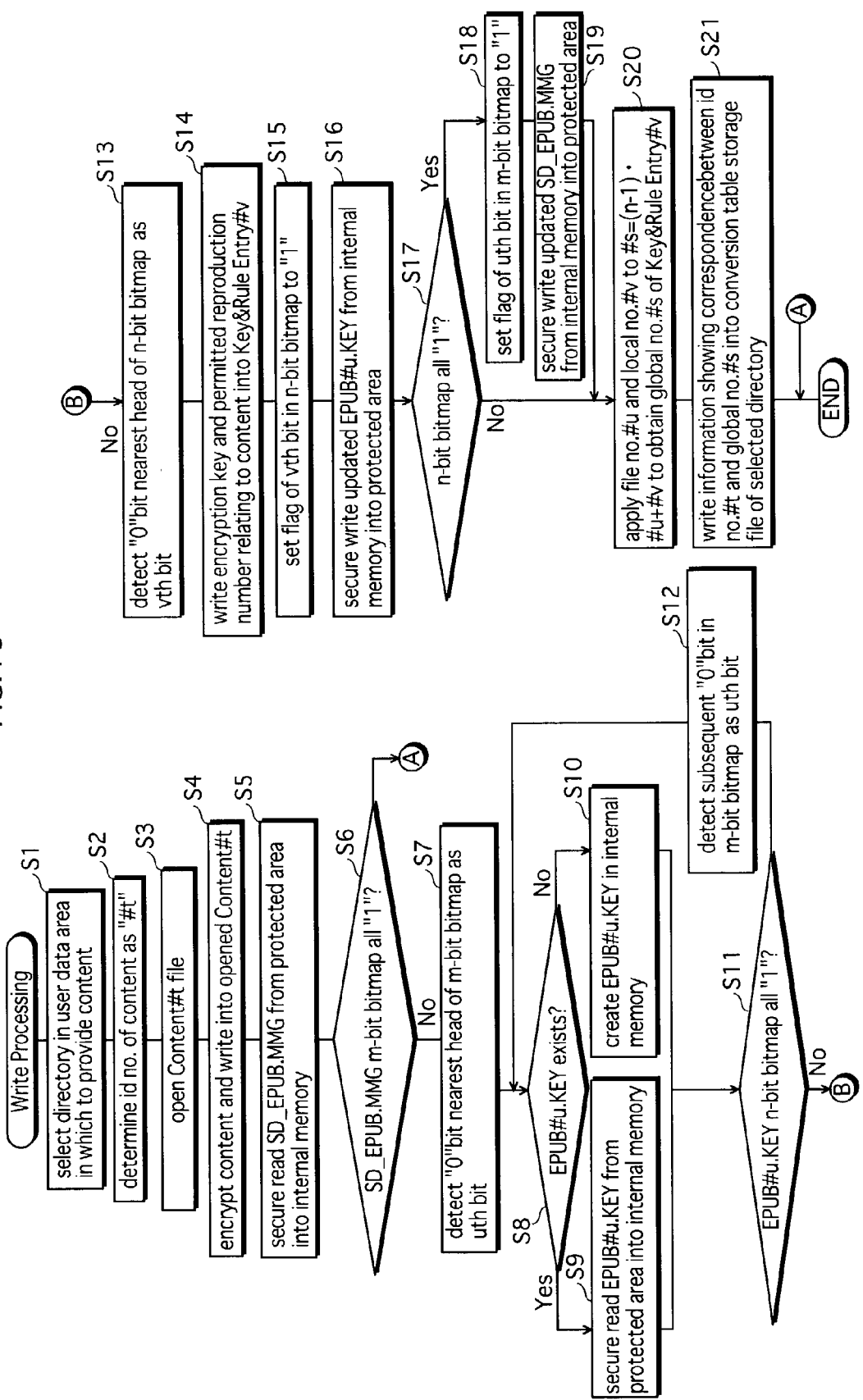
FIG. 16 is a flowchart of a write processing operation.

Control unit 15 includes a processor (CPU) and a ROM storing a program in executable format, and functions to execute write processing, reproduction (i.e. read) processing, and delete processing with respect to the SD memory card. These processing operations will now be described in the stated order. FIG. 16 is a flowchart of the operations involved in the write processing. The write processing is conducted by the CPU in control unit 15 executing a program formed from the processing operation shown in the FIG. 16 flowchart. Steps S1 to S4 in the flowchart related to the writing of new content. In step S1, control unit 15 selects a directory in the user data area to provide the new content. In step S2, control unit 15 determines the ID number of the content as "#t". In step S3, control unit 15 opens the file having "#t" in its filename (i.e. Content#t). In step S4, control unit 15 encrypts the content and writes the encrypted content into the opened Content#t file.

Steps S5 to S20 relate to the writing of secure data (e.g. an encryption key, permitted reproduction number) relating to the new content into the protected area. Of these steps, S5 to S16 relate to determining which of the plurality of EPUBxxx.KEY files in the protected area is to be targeted for the writing of the secure data. In step S5, control unit 15 secure reads SD_EPUB.MMG from the protected area of the SD memory card into internal memory 10 of the recording apparatus. In step S6, control unit 15 judges whether all the bits in the m-bit bitmap of SD_EPUB.MMG stored in internal memory 10 are "1". If "yes", then control unit 15 terminates the write processing. If "no" (i.e. at least one "0" flag), then step S7.

In step S7, control unit 15 detects the "0" bit nearest the head of the bitmap in SD_EPUB.MMG as the $u^{th}$ bit. In step S8, control unit 15 judges whether there exists a EPUB#u.KEY file corresponding to the $u^{th}$ bit. If "no" then step S9, and if "yes" then step S10. In step S9, control unit 15 creates a EPUB#u.KEY file in internal memory 10, and proceeds to step S11. In step S10, control unit 15 secure reads EPUB#u.KEY from the protected area into internal memory 10 in the recording apparatus, and proceeds to step S11.

In step S11, control unit 15 judges whether all bits of the n-bit bitmap in EPUB#u.KEY stored in internal memory 10 are "1". The judgment in step S11 is conducted as a safeguard against the unlikely possibility of an error in which the u bit in the SD_EPUB.MMG bitmap is "0" despite there being no unused Rule&Key Entry areas in EPUB#u.KEY. In step S11, if "yes" then step S12, and if "no" then step S13. In step S12, control unit 15 detects the subsequent "0" flag in the SD_EPUB.MMG bitmap as the $u^{th}$ bit, and returns to step S8. If required, steps S10 to S12 are repeated until a EPUB#u.KEY file having a bitmap with a "0" flag is detected, after which control unit 15 proceeds to step S13.

Steps S13 to S16 relate to the writing of secure data into an unused Rule&Key Entry area. In step S13, control unit 15 detects a "0" flag nearest the head of the bitmap in the EPUB#u.KEY file stored in internal memory 10 as the $v^{th}$ bit. In step S14, control unit 15 writes an encryption key and a permitted reproduction number relating to the new content into the Rule&Key Entry area in EPUB#u.KEY corresponding to the $v^{th}$ bit (i.e. Rule&Key Entry#v). In step S15, control unit 15 sets the $v^{th}$ bit in the EPUB#u.KEY bitmap to "1". In step S16, control unit 15 secure writes the updated EPUB#u.KEY file from internal memory 10 of the recording apparatus into the protected area of the SD memory card. Here, it is possible that the setting of the $v^{th}$ bit to "1" in step S15 may result in all the bits in the EPUB#u.KEY bitmap becoming "1". While the chances of this are 1/(n−1) or greater, it remains a possibility, and so in step S17, control unit 15 judges whether all the bits in the EPUB#u.KEY bitmap are now "1". In "yes" then step S18, and if "no" then step S20.

In step S18, control unit 15 sets the u bit of the bitmap in SD_EPUB.MMG stored in internal memory 10 to "1". In step S19, control unit 15 secure writes the updated SD_EPUB.MMG file from internal memory 10 into the protected area. In step S20, control unit 15 calculates the global number#s of the Key&Rule Entry area into which the secure data was written by applying file number#u and local number#v as determined according to the above operations to the equation #s=(n−1)·#u+#v. In step S21, control unit 15 writes information in which content number#t corresponds to global number#s into the conversion table storage file in the directory in which the new content has been recorded. Thus completes the write processing of new content with respect to the SD memory card.

When priority is given to the selection of unused Key&Rule Entry areas in an existing EPUB#u.KEY file for the writing of new secure data, EPUBxxx.KEY files such as EPUB001.KEY and EPUB002.KEY having low file numbers will be particularly targeted, thereby resulting in a shortening of the lifespan of erasable blocks corresponding to these files. This undesirable effect can be overcome in the following way. A table can be stored in the SD memory card in which a logical address corresponds to the physical address allotted in advance to each erasable block, and a targeting of EPUBxxx.KEY files for writing can be managed by way of this logical address. This frees up the allotment of erasable blocks with respect to files such as EPUB001.KEY and EPUB002.KEY having low file numbers. That is, by rewriting the table the allotment of erasable blocks can be varied, thus avoiding the lifespan of any one erasable block being unnecessarily shortened, even when the write processing is concentrated on files such as EPUB001.KEY and EPUB002.KEY having low file numbers. Having described the writing processing of new content, the description now moves on to the reproduction processing of stored content.

Figure 17:
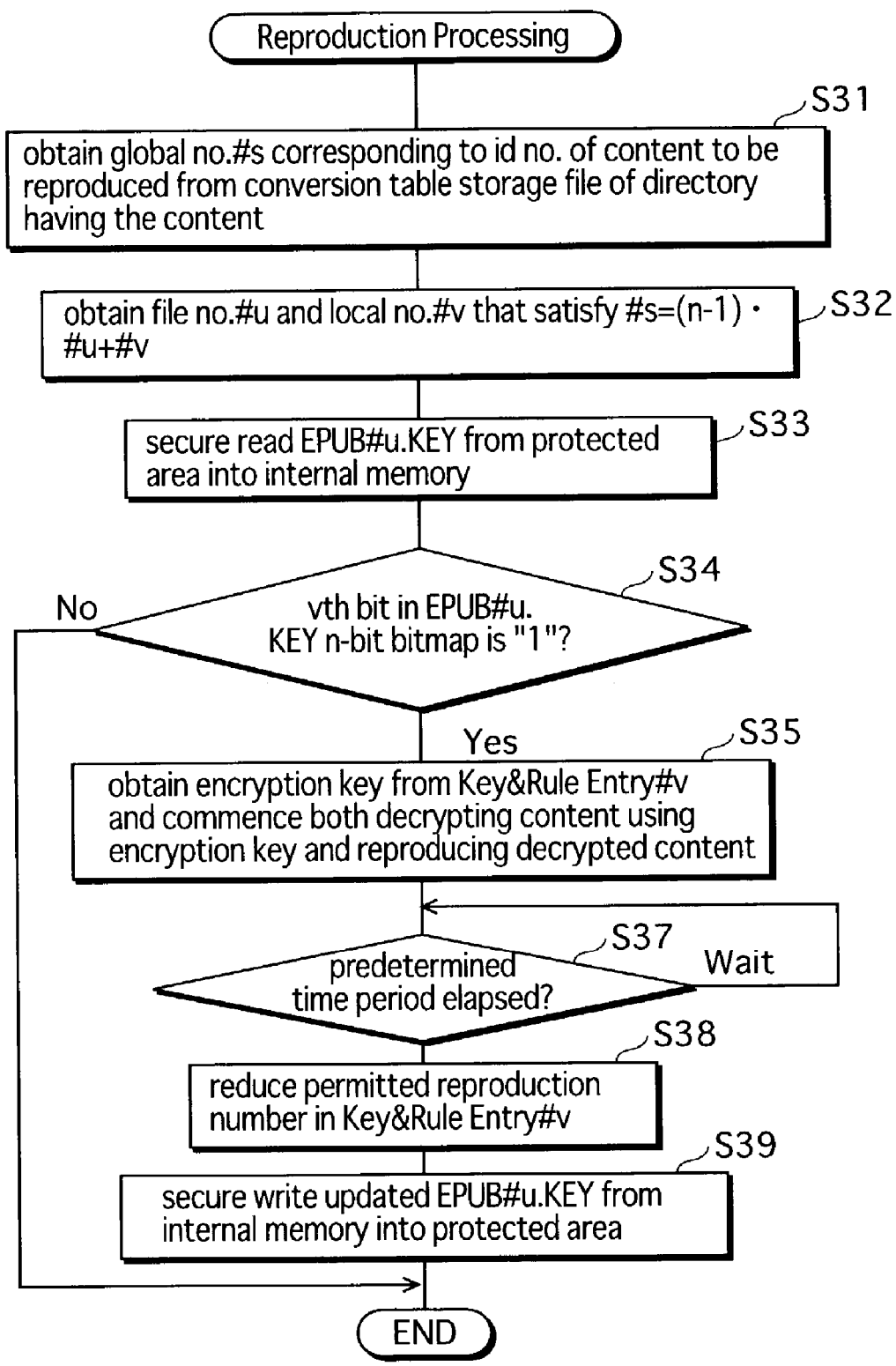
FIG. 17 is a flowchart of reproduction processing operation.

FIG. 17 is a flowchart of the processing operation involved in the reproduction of content stored in the user data area of an SD memory card. The reproduction of content is achieved as a result of the CPU in control unit 15 executing a computer program comprising the operations shown in the FIG. 17 flowchart. The reproduction processing will be described by supposing a user operation via browser unit 11 instructing the reproduction of content provided in one of the directories in the user data area. In step S31, control unit 15 obtains the global number#s of the Key&Rule Entry area corresponding to the content to be reproduced from the conversion table storage file of the directory in which the content is provided. In step S32, control unit 15 obtains the file number#u and local number#v of the EPUBxxx.KEY and Key&Rule Entry area, respectively, that satisfy the equation #s=(n−1)·#u+#v. In step S33, control unit 15 secure reads EPUB#u.KEY from the protected area into internal memory 10. In step S34, control unit 15 judges whether the $v^{th}$ bit of the bitmap in EPUB#u.KEY stored in internal memory 10 is "1". Here, although the conversion table storage file clearly shows whether Key&Rule Entry#v corresponding the $v^{th}$ bit is in use or not, step S34 is conducted as a safeguard against the unlikely possibility of an error in which Key&Rule Entry#v is currently not in use. If step S34 is "no" (i.e. $v^{th}$ bit="0"), control unit 15 terminates the reproduction processing. If step S34 is "yes" (i.e. $v^{th}$ bit="1"), then step S35. Steps 35 to 39 relate to the actual reproduction of the content.

In step S35, control unit 15 obtains the encryption key from Key&Rule Entry#v, and commences both decrypting the encrypted content using the read encryption key and reproducing the decrypted content. In step S37, control unit 15 waits for a predetermined time period to pass, and proceeds to step S38 when the predetermined time period has passed. In step S38, control unit 15 decrements by one the permitted reproduction number in Key&Rule Entry#v. In step S39, control unit 15 secure writes the updated EPUB#u.KEY file into the protected area. Thus completes the description of the reproduction processing. The description now moves on to the delete processing.

Figure 18:
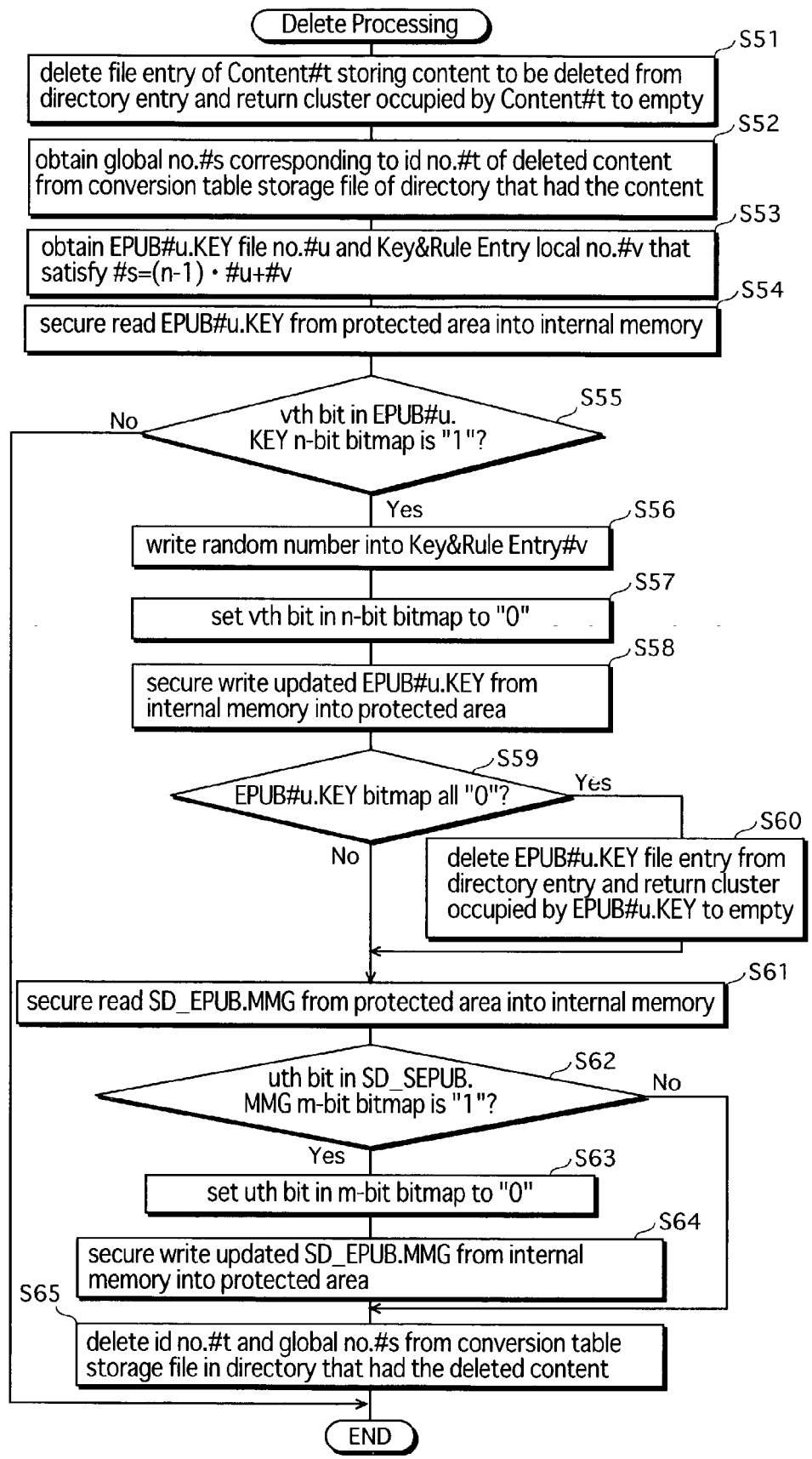
FIG. 18 is a flowchart of a delete processing operation.

FIG. 18 is a flowchart of the processing operation involved in the deletion of content stored in the user data area of an SD memory card. The delete processing is conducted by having the CPU execute a computer program comprising the processing operation shown in the FIG. 18 flowchart. The delete processing will be described by supposing the deletion of content provided in one of the directories in the user data area of the SD memory card as instructed by a user operation via browser unit 11. In step S51, control unit 15 deletes from the directory entry the file#t containing the content to be deleted, and returns the cluster occupied by the file#t to empty. In step S52, control unit 15 obtains the global number#s of the key&Rule Entry area corresponding to the content to be deleted. In step S53, control unit 15 obtains the file number#u and local number#v of the EPUBxxx.KEY file and Key&Rule Entry area, respectively, that satisfy the equation #s=(n−1)·#u+#v. In step S54, control unit 15 secure reads EPUB#u.KEY from the protected area into internal memory 10.

In step S55, control unit 15 judges whether the $v^{th}$ bit of the bitmap in the EPUB#u.KEY stored in internal memory 10 is "1". Here, although the conversion table storage file clearly shows whether the Key&Rule Entry area corresponding to the $v^{th}$ bit (i.e. Key&Rule Entry#v) is in use or not, step S55 is conducted as a safeguard against the unlikely possibility of an error in which Key&Rule Entry#v is actually not in use. If step S55 is "no", then control unit 15 terminates the delete processing. If step S55 is "yes", then step S56.

Steps S56 to S58 relate to the actual deletion of Key&Rule Entry#v. Instep S56, control unit 15 writes a random number into Key&Rule Entry#v in EPUB#u.KEY stored in internal memory 10. In step S57, control unit 15 sets the $v^{th}$ bit in the EPUB#u.KEY bitmap to "0". In step S58, control unit 15 secure writes the updated EPUB#u.KEY file stored from internal memory 10 into the protected area.

Here, the possibility exists that setting the $v^{th}$ bit in the EPUB#u.KEY bitmap to "0" in step S57 may result in all the bits in the EPUB#u.KEY bitmap becoming "0". In step S59, control unit 15 judges whether all the bits in the EPUB#u.KEY bitmap are now "0". In step S59 if "yes" then step S60, and if "no" then step S61. In step S60, control unit 15 deletes the file entry relating to EPUB#u.KEY from the directory entry, and returns the cluster occupied by EPUB#u.KEY to empty. The number of EPUBxxx.KEY files in the protected area is reduced as a result of this deletion. If a new EPUBxxx.KEY file is created in the protected area, the new file will be allotted the file number of the deleted EPUB#u.KEY file (i.e. "#u"). The reuse of file numbers is thus provided for. That is, gaps opened up in the sequence of file numbers as a result of the deletion of EPUBxxx.KEY files can be eliminated by reusing the file number of the deleted files.

Furthermore, if the $v^{th}$ bit in the EPUB#u.KEY bitmap is updated to show a "0" value, there is a probability of at least 1/(n−1) that the SD_EPUB.MMG bitmap will also require updating. In other words, if an all "1" flag bitmap in EPUB#u.KEY reverts to a bitmap having a single "0" flag as a result of the setting change in step S57, the SD_EPUB.MMG bitmap will require updating in order to reflect this fact. Thus in step S61, control unit 15 secure reads SD_EPUB.MMG from the protected area into internal memory 10. In step S62 control unit 15 judges whether the $u^{th}$ bit in the SD_EPUB.MMG bitmap in internal memory 10 is "1". If yes then step S63, and if "no" then step S65.

Steps S63 and S64 relate to the updating of SD_EPUB.MMG. In step S63, control unit 15 sets the uth bit in the SD_EPUB.MMG bitmap to "0". In step S64, control unit 15 secure writes the updated SD_EPUB.MMG file stored in internal memory 10 of the recording apparatus into the protected area.

In step S65, control unit 15 deletes from the conversion table storage file the id number#t of the deleted content and the global number#s of the Key&Rule Entry area corresponding to the deleted content. Thus completes the delete processing.

In embodiment 4 as described above, a new EPUBxxx.KEY file is only created after all the Key&Rule Entry areas in existing EPUBxxx.KEY files have been written, and as a result unwarranted creation of new EPUBxxx.KEY files is avoided. Minimizing the number of EPUBxxx.KEY files in this way allows for the efficient organization of stored content on the SD memory card to be maintained over the long term. Since the protected area often occupies a comparatively small percentage of the total area available on an SD memory card, a physical limit is placed on the number of files that may be recorded therein. As such, the ability of the recording apparatus in embodiment 4 to write data while minimizing the number of EPUBxxx.KEY files in the protected area of an SD memory card provides a most efficient and effective way of utilizing the protected area.

The data structure and the various processing operations disclosed in embodiments 1 to 4 of the present invention are based on the following international patent application publications, and a more detailed description of related technical matters can be obtained by referring to these references:

WO 00/65602 (Feb. 11, 2000)
WO 00/74054 (Jul. 12, 2000)
WO 00/74059 (Jul. 12, 2000)
WO 00/74060 (Jul. 12, 2000)
WO 01/16821 (Aug. 3, 2001)

Variations

While the present invention has been described in terms of the above embodiments, these are merely examples of the best mode of the invention as presently conceivable. Therefore, variations of the present invention are permissible within the scope of the above disclosures. Exemplary variations (A) to (J) are given below.

(A) In embodiment 1, the maximum number of Rule&Key Entry areas is determined by the equation n·m, where "n" is the number of Rule&Key Entry areas in a single EPUBxxx.KEY file and "m" is the number of bits in the SD_EPUB.MMG bitmap. This maximum number is based on there being one SD_EPUB.MMG file in the protected area. Thus, the maximum number can be multiplied by increasing the number of SD_EPUB.MMG files. For example, if two SD_EPUB.MMG files are provided in the protected area, the maximum number of Rule&Key Entry areas becomes 2·n·m.

(B) In embodiment 1, the m-bit bitmap showing the condition of the EPUBxxx.KEY files is placed in SD_E-

PUB.MMG. However, this bitmap may be placed in the first EPUBxxx.KEY file (e.g. EPUB001.KEY). In other words, embodiment 1 requires two file access operations (i.e. once to open SD_EPUB.MMG, and once again to open EPUB#u.KEY having an unused Rule&Key Entry area), whereas this variation allows for the condition of the EPUBxxx.KEY files to be determined merely by opening EPUB001.KEY. If there is an unused Rule&Key Entry area in EPUB001.KEY, new secure data can thus be written by opening only one file. Even if there are no unused Rule&Key Entry areas in EPUB001.KEY, EPUB#u.KEY can still be determined from the m-bit bitmap in EPUB001.KEY, and thus no more than two file access operation will be required in the writing.

Also, although in embodiment 1 an n-bit bitmap showing the condition of Rule&Key Entry areas is provided in each EPUBxxx.KEY file, the n-bit bitmaps may alternatively be provided in SD_EPUB.MMG.

(C) A search for an EPUBxxx.KEY file (i.e. EPUB#u.KEY) having unused Rule&Key Entry areas may be conducted by referring only to the m-bit bitmap in SD_EPUB.MMG, without providing n-bit bitmaps in each EPUBxxx.KEY file. In other words, if the recording apparatus investigates the condition of Rule&Key Entry areas in files before writing new secure data, there will be no need to provide bitmaps that show the condition of each Rule&Key Entry area. This variation is premised on unused Rule&Key Entry areas (i.e. areas having yet to be written or having had data deleted) being set at a value that allows the deletion condition to be quickly determined (e.g. "000000000"). However, since secure data is stored in encrypted form, and secure data is generally deleted by writing a random number into the Rule&Key Entry area in which the secure data is stored, distinguishing between encrypted data and deleted data is not easy. Thus conducting the investigation mentioned above is not practically realizable. In embodiment 1, the flags of the bitmap in each EPUBxxx.KEY file clearly show for each Rule&Key Entry area whether the Rule&Key Entry area has had secure data recorded or deleted. Thus, by referring to the n-bit bitmap it is possible to quickly determine which Rule&Key Entry areas in a file are not in use and which Rule&Key Entry areas have been written.

(D) Embodiments 1 to 4 are described by referring to an exemplary SD memory card that incurs an overhead relating to the mutual authentication required to access files. However, embodiments 1 to 4 may be applied to any recording medium incurring an overhead that results in time being taken to open a plurality of files. For instance, the recording medium may be a flash memory card, examples of which include a compact flash card, a smart media, a memory stick, a multimedia card, and a PCM-CIA card. Other than a semiconductor memory card, the recording medium may be an optical disk, examples of which include a magnetic recording disk (e.g. flexible disk, SuperDisk, Zip, Clik!), a removable hard disk drive (e.g. ORB, Jaz, SparQ, SyJet, EZFley, micro drive), a DVD-RAM, a DVD-RW, a PD, a DVD+RW, and a CD-RW.

(E) As shown in the flowcharts in FIGS. 16 to 18, the characteristics of the recording apparatus described in embodiment 4 are realized through ameliorations effected by a computer-readable computer program. As such, the computer program may be performed independently of the recording apparatus. If the computer program is stored on a storage medium, the storage medium may be distributed or lent to a user, and the computer program then performed independently by the user. Alternatively, if the computer program is distributed over a network, a user may download the computer program, and the downloaded computer program then be performed independently by the user.

(F) In embodiments 1 to 4, the content to be recorded on the SD memory card is described as being an electronic publication. However, other content may be recorded on the SD memory card, examples of which include music and movies.

(G) In the above embodiments, m number of bits in an m-bit bitmap are allotted one-to-one to m number of EPUBxxx.KEY files, which allows two conditions to be shown for each EPUBxxx.KEY file; that is, whether the file has (i) one or more unused Key&Rule Entry areas, or (ii) all Key&Rule Entry areas in use. However, by increasing the number of allotted bits, three or more conditions may be shown for each EPUBxxx.KEY file.

(H) In the above embodiments, n number of bits in an n-bit bitmap are allotted one-to-one to n number of Key&Rule Entry areas in each EPUBxxx.KEY file, which allows two conditions to be shown for each Key&Rule Entry area in a EPUBxxx.KEY file; that is, whether the Key&Rule Entry area is (i) not in use, or (ii) in use. However, by increasing the number of allotted bits, three or more conditions may be shown for each Key&Rule Entry area.

(I) The above embodiments are described in terms of rights management information being recorded in the protected area. However, other types of information requiring a high level of confidentiality may be recorded in the protected area, examples of which include billing information, private information, and trade secret information. Also, if the content to be reproduced is a publication as described in embodiments 1 to 4, reproduction processing may involve variations such as the display or printing of the publication. The permitted conditions of use can be determined depending on the form of reproduction.

(J) In the above embodiments, the rights management information sets the permitted conditions of usage such as reproduction, copying, and the like. Copy processing may involve variations such as transfer, migration, and checkout copying. Transfer copying is used to transfer content between recording mediums when the original content is to be deleted.

Migration copying is premised on rights management information being generated on the recording medium onto which the content is to be copied.

Checkout copying is one type of copy processing used when the permitted number of copies is limited, the copying being executed after decrementing the permitted number of copies by one. Different from other forms of limited number copying, checkout copying allows for the permitted number of copies to also be incremented. The permitted number of copies can be incremented after first conducting "check-in" processing to prohibit the reproduction of content copied onto a recording medium.

(K) The permitted conditions of use in the rights management information may be designated in any manner preferred. For example, restrictions may be applied to the remaining number of reproductions or copies, or alternatively an upper limit may be set. These restrictions may also be applied in terms of time rather than frequency of use, or otherwise an effective period of use may be set.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus for writing an encrypted content to a user data area of a semiconductor memory card,
the semiconductor memory card including:
an authentication circuit for authenticating an apparatus to which the semiconductor memory card is connected; and
a protected area which is accessed by the apparatus only when the apparatus has been authenticated by the authentication circuit,
a plurality of entry set files and a file condition management file being recorded in the protected area,
each of the entry set files including a fixed number of entry areas and entry condition information that includes a flag sequence having a plurality of flags that correspond one-to-one with the plurality of entry areas in a single file, each flag being set as one of an off-flag showing the corresponding entry area to be unused, and an on-flag showing the corresponding entry area to be in use, and
the file condition management file including file condition information that indicates, for each of the entry set files recorded in the protected area of the semiconductor memory card, whether the entry set file is in a first condition in which one or more entry areas are not in use, or in a second condition in which all the entry areas are in use, and
said recording apparatus comprising:
an authenticating unit operable to perform mutual authentication with the authentication circuit of the semiconductor memory card;
a reading unit operable to read the file condition management file from the protected area in the semiconductor memory card in a case of legitimacy being authenticated by the mutual authentication;
a specifying unit operable to specify, from among the plurality of entry set files recorded in the protected area of the semiconductor memory card, an entry set file in the first condition by referring to the file condition information in the read file condition management file, and acquire entry condition information in the specified entry set file;
a writing unit operable to write one of a decryption key and rights management information that both relate to the encrypted content, to an entry area corresponding to the off-flag, from among the plurality of entry areas in the specified entry set file; and
an updating unit operable to update the file condition management file in the protected area of the semiconductor memory card so as to show an entry set file as being in the second condition if all the entry areas therein become in use as a result of the writing of the data by said writing unit.

2. The recording apparatus of claim 1, wherein the file condition management file is updated by said updating unit so as to show, when an entry area in an entry set file in the second condition becomes not in use, the entry set file as being in the first condition.

3. The recording apparatus of claim 1, wherein there are m number of entry set files, m being an integer having a value of 2 or greater,
wherein the file condition information is a flag sequence having m number of flags that correspond one-to-one with the m number of entry set files, each flag being set as one of an off-flag showing the corresponding entry set file to be in the first condition, and an on-flag showing the corresponding entry set file to be in the second condition,
wherein the entry set file specified by said writing unit corresponds to the off-flag, and
wherein the updating by said updating unit involves changing the off-flag to the on-flag if all the entry areas in the specified entry set file become in use as a result of the writing of the data by said writing unit.

4. The recording apparatus of claim 3, wherein the off-flag to which the entry set file corresponds is an off-flag nearest a head of the flag sequence.

5. The recording apparatus of claim 1, further comprising:
a creating unit operable to create an entry set file that is in the first condition if all of the entry set files in the protected area of the semiconductor memory card are shown to be in the second condition when the read file condition information is referred to by said writing unit.

6. The recording apparatus of claim 1, wherein the off-flag to which the entry area corresponds is an off-flag nearest a head of the flag sequence.

7. The recording apparatus of claim 1,
wherein the protected area of the semiconductor memory card is formed from a plurality of clusters,
wherein the entry areas in the entry set files are each of a constant length, and
wherein the number of entry areas in each entry set file is set such that a size of each entry set file is less than or equal to a size of a cluster.

8. The recording apparatus of claim 7,
wherein the semiconductor memory card requires that data recorded thereon be erased before the writing of the data by said writing unit, and
wherein the size of a cluster is equal to or a fraction of a size of a minimum erasable area of the semiconductor memory card.

9. A semiconductor memory card including:
an authentication circuit for authenticating an apparatus to which the semiconductor memory card is connected;
a protected area which is accessed by the apparatus only when the apparatus has been authenticated by the authentication circuit; and
a user data area which is accessed regardless of a result of the authentication, wherein
the user data area is an area for having recorded therein an encrypted content,
a plurality of entry set files and a file condition management file are recorded in the protected area,
each of the entry set files includes a fixed number of entry areas and entry condition information, and is an area for having recorded therein an encryption key and/or a usage rule that both relate to the encrypted content,
the entry condition information includes a flag seciuence having a plurality of flags that correspond one-to-one with the plurality of entry areas in a single entry set file, each flag being set as one of an off-flag showing the corresponding entry area to be unused, and an on-flag showing the corresponding entry area to be in use, and
the file condition management file includes file condition information that indicates, for each of the entry set files recorded in the protected area of the semiconductor memory card, whether the entry set file is in a first condition in which one or more entry areas are not in use, or in a second condition in which all the entry areas are in use.

10. The semiconductor memory card of claim 9, wherein there are m number of entry set files, m being an integer having a value of 2 or greater, and the file condition management file is a flag sequence having m number of flags that correspond one-to-one with the m number of entry set files, each flag being set as one of an off-flag showing the corresponding entry set file to be in the first condition, and an on-flag showing the corresponding entry set file to be in the second condition.

11. The semiconductor memory card of claim 9, wherein the protected area of the semiconductor memory card is formed from a plurality of clusters, wherein the entry areas in the entry set files are each of a constant length, and wherein the number of entry areas in each entry set file is set such that a size of each entry set file is less than or equal to a size of a cluster.

12. The semiconductor memory card of claim 11, wherein the semiconductor memory card requires that data recorded thereon be erased before writing of data by a writing unit, and wherein the size of a cluster is equal to or a fraction of a size of a minimum erasable area of the semiconductor memory card.

13. A computer program embodied on a computer-readable medium for having a computer perform a recording method for recording an encrypted content to a user data area of a semiconductor memory card, the semiconductor memory card including an authentication circuit for authenticating an apparatus to which the semiconductor memory card is connected, and a protected area which is accessed by the apparatus only when the apparatus has been authenticated by the authentication circuit, a plurality of entry set files and a file condition management file being recorded in the protected area, each of the entry set files including a fixed number of entry areas and entry condition information that includes a flag seciuence having a plurality of flags that correspond one-to-one with the plurality of entry areas in a single file, each flag being set as one of an off-flag showing the corresponding entry area to be unused, and an on-flag showing the corresponding entry area to be in use, and the file condition management file including file condition information that indicates, for each of the entry set files recorded in the protected area of the semiconductor memory card, whether the entry set file is in a first condition in which one or more entry areas are not in use, or in a second condition in which all the entry areas are in use, the recording method comprising:

an authenticating step of performing mutual authentication with the authentication circuit of the semiconductor memory card;

a reading step of reading the file condition management file from the protected area in the semiconductor memory card in a case of legitimacy being authenticated by the mutual authentication;

a specifying step of specifying, from among the plurality of entry set files recorded in the protected area of the semiconductor memory card, an entry set file in the first condition by referring to the file condition information in the read file condition management file, and acquiring entry condition information in the specified entry set file;

a writing step of writing one of a decryption key and rights management information that both relate to the encrypted content, to an entry area corresponding to the off-flag, from among the plurality of entry areas in the specified entry set file; and an updating step of updating the file condition management file in the protected area of the semiconductor memory card so as to show an entry set file as being in the second condition if all the entry areas therein become in use as a result of the writing of the data in the writing step.

14. The computer program of claim 13, wherein the file condition management file is updated in the updating step so as to show, when an entry area in an entry set file in the second condition becomes not in use, the entry set file as being in the first condition.

15. The computer program of claim 13, wherein there are m number of entry set files, m being an integer having a value of 2 or greater, wherein the file condition information is a flag sequence having m number of flags that correspond one-to-one with the m number of entry set files, each flag being set as one of an off-flag showing the corresponding entry set file to be in the first condition, and an on-flag showing the corresponding entry set file to be in the second condition, wherein the entry set file specified in the writing step corresponds to the off-flag, and wherein the updating in the updating step involves changing the off-flag to the on-flag if all the entry areas in the specified entry set file become in use as a result of the writing of the data in the writing step.

16. The computer program of claim 15, wherein the off-flag to which the entry set file corresponds is an off-flag nearest a head of the flag sequence.

17. The computer program of claim 13, further comprising:

a creating step of creating an entry set file that is in the first condition if all of the entry set files in the protected area of the semiconductor memory card are shown to be in the second condition when the read file condition management file is referred to in the writing step.

18. The computer program of claim 13, wherein the off-flag to which the entry area corresponds is an off-flag nearest a head of the flag sequence.

19. The computer program of claim 13, wherein the protected area of the semiconductor memory card is formed from a plurality of clusters, wherein the entry areas in the entry set files are each of a constant length, and wherein the number of entry areas in each entry set file is set such that a size of each file is less than or equal to a size of a cluster.

20. The computer program of claim 19, wherein the semiconductor memory card requires that data recorded thereon be erased before the writing of the data in the writing step, and wherein the size of a cluster is equal to or a fraction of a size of a minimum erasable area of the semiconductor memory card.

21. A recording method for recording an encrypted content to a user data area of a semiconductor memory card, the semiconductor memory card including an authentication circuit for authenticating an apparatus to which the semiconductor memory card is connected, and a protected area which is accessed by the apparatus only when the apparatus has been authenticated by the authentication circuit, a plurality of entry set files and a file condition management file being recorded in the protected area, each of the entry set files including a fixed number of entry areas and entry condition information that includes a flag sequence having a plurality of flags that correspond one-to-one with the plurality of entry areas in a single file, each flag being set as one of an off-flag showing the corresponding entry area to be unused, and an on-flag showing the corresponding entry area to be in use, and the file condition management file including file condition information that indicates, for each of the entry set files recorded in the protected area of the semiconductor memory card, whether the entry set file is in a first condition in which one or more entry areas are not in use, or in a second condition in which all the entry areas are in use, the recording method comprising:

- an authenticating step of performing mutual authentication with the authentication circuit of the semiconductor memory card;
- a reading step of reading the file condition management file from the protected area in the semiconductor memory card in a case of legitimacy being authenticated by the mutual authentication;
- a specifying step of specifying, from among the plurality of entry set files recorded in the protected area of the semiconductor memory card, an entry set file in the first condition by referring to the file condition information in the read file condition management file, and acquiring entry condition information in the specified entry set file;
- a writing step of writing one of a decryption key and rights management information that both relate to the encrypted content, to an entry area corresponding to the off-flag, from among the plurality of entry areas in the specified entry set file; and
- an updating step of updating the file condition management file in the protected area of the semiconductor memory card so as to show an entry set file as being in the second condition if all the entry areas therein become in use as a result of the writing of the data in the writing step.

* * * * *

UNITED STATES PATENT AND TRADEMARK OFFICE
CERTIFICATE OF CORRECTION

PATENT NO. : 7,269,741 B2  
APPLICATION NO. : 10/187896  
DATED : September 11, 2007  
INVENTOR(S) : Shinichi Matsui et al.

Page 1 of 1

It is certified that error appears in the above-identified patent and that said Letters Patent is hereby corrected as shown below:

Column 22,  
Line 55, "a flag seciuence" should read --a flag sequence--.

Column 23,  
Line 39, "a flag seciuence" should read --a flag sequence--.

Signed and Sealed this

Sixth Day of May, 2008

JON W. DUDAS  
*Director of the United States Patent and Trademark Office*